US012449681B2

United States Patent
Le et al.

(10) Patent No.: US 12,449,681 B2
(45) Date of Patent: Oct. 21, 2025

(54) POLARIZATION BASED DUAL IMAGING OPTICAL SYSTEM

(71) Applicant: Tencent America LLC, Palo Alto, CA (US)

(72) Inventors: John D. Le, Palo Alto, CA (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 360 days.

(21) Appl. No.: 18/142,440

(22) Filed: May 2, 2023

(65) Prior Publication Data
US 2024/0369861 A1 Nov. 7, 2024

(51) Int. Cl.
*G02B 3/08* (2006.01)
*G02B 27/14* (2006.01)
*G02F 1/01* (2006.01)
*G06F 1/16* (2006.01)

(52) U.S. Cl.
CPC ............ *G02F 1/0136* (2013.01); *G02B 3/08* (2013.01); *G02B 27/144* (2013.01); *G02F 2203/12* (2013.01); *G06F 1/163* (2013.01)

(58) Field of Classification Search
CPC ..... G02F 1/0136; G02F 2203/12; G02B 3/08; G02B 27/144; G02B 2027/0185; G02B 27/0172; G02B 27/283; G02B 27/286; G06F 1/163
See application file for complete search history.

(56) References Cited

U.S. PATENT DOCUMENTS 10,215,890 B2   2/2019   Perreault et al.
10,663,745 B2   5/2020   Ouderkirk et al.

OTHER PUBLICATIONS

Frisen, Lars, and Anders Glansholm. "Optical and neural resolution in peripheral vision." Investigative Ophthalmology & Visual Science 14.7 (1975): 528-536.
Costa, Ana Luiza Fontes de Azevedo, and Vagner Rogerio dos Santos. "From vision to citizenship: types of tables to assess reading in special education." Revista Brasileira de Oftalmologia 77 (2018): 296-302.

(Continued)

*Primary Examiner* — Towfiq Elahi
(74) *Attorney, Agent, or Firm* — ArentFox Schiff LLP

(57) ABSTRACT

Aspects of the disclosure provide an optical system. The optical system includes a polarization controller that controls polarization states of light beams such that a polarization state of each light beam passing through the polarization controller has one of a first polarization state and a second polarization state. The optical system includes a beam splitter, a reflective polarizer, and one or more lenses between the beam splitter and the reflective polarizer. If a polarization state of a first light beam of the light beams that passes through the polarization controller has the first polarization state, the first light beam passes the one or more lenses only one time. If a polarization state of a second light beam of the light beams that passes through the polarization controller has the second polarization state, the second light beam passes the one or more lenses more than one time.

17 Claims, 9 Drawing Sheets

(56) References Cited

OTHER PUBLICATIONS

Wong, Timothy L., et al. "Folded optics with birefringent reflective polarizers." Digital Optical Technologies 2017. vol. 10335. SPIE, 2017, pp. 1-8.
Hao, B., Wong, T., Le, J., Aastuen, D., Kotz, A., Rosen, D., McGrath, K. and Kent, S., "Building a Predictive Model of Contrast Ratio of Folded Optic Lens Systems for Virtual Reality". 3M Company, 3M Center, St. Paul, MN, 2022, pp. 1-4.
Kress, B.C. and Peroz, C., Feb. 2020, Optical architectures for displays and sensing in augmented, virtual, and mixed reality (AR, VR, MR). In Proc. SPIE (vol. 11310, p. 1131001).
Kress, B.C., 2020. Optical architectures for augmented-, virtual-, and mixed-reality headsets. (No. Title). chapter 5-6 (p. 37-52).

POLARIZATION BASED DUAL IMAGING OPTICAL SYSTEM

TECHNICAL FIELD

The present disclosure relates to near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide an optical system. The optical system includes a polarization controller configured to control polarization states of light beams incident onto the polarization controller such that a polarization state of each light beam passing through the polarization controller has one of a first polarization state and a second polarization state. The optical system includes a beam splitter configured to partially transmit and partially reflect the light beams incident onto the beam splitter. The optical system includes a reflective polarizer configured to pass the light beams having a third polarization state and reflect the light beams having a fourth polarization state that is orthogonal to the third polarization state and one or more lenses between the beam splitter and the reflective polarizer. If a polarization state of a first light beam of the light beams that passes through the polarization controller has the first polarization state, the first light beam passes the one or more lenses only one time. If a polarization state of a second light beam of the light beams that passes through the polarization controller has the second polarization state, the second light beam passes the one or more lenses more than one time.

In an embodiment, the polarization state of the first light beam that passes through the polarization controller has the first polarization state, the first light beam passes the one or more lenses only one time, and a first focal length of the one or more lenses for the first light beam in the first polarization state is different from a second focal length of the one or more lenses for the second light beam in the second polarization state.

In an embodiment, the polarization state of the second light beam that passes the polarization controller has the second polarization state, and the second light beam passes the one or more lenses more than one time.

In an embodiment, an optical cavity including the one or more lenses is formed between the beam splitter and the reflective polarizer, and the second light beam passes the optical cavity three times before reaching a viewing position.

In an embodiment, the optical system includes a quarter waveplate (QWP) that is positioned between the beam splitter and the reflective polarizer.

In an example, the optical system further includes a first lens, the one or more lenses includes a second lens, the second lens is positioned between the first lens and a display device, and the first lens is positioned between the second lens and a viewing position. The first lens and the second lens can be separated by a gap.

One of the first lens and the second lens includes a Fresnel structure.

In an example, the beam splitter is positioned between the second lens and the display device, the reflective polarizer is positioned between the first lens and the second lens, and the QWP is positioned between the beam splitter and the reflective polarizer.

In an example, the first light beam passes the polarization controller at a first time point, the optical system has a first focal length at the first time point, the second light beam passes the polarization controller at a second time point that is different from the first time point, and the optical system has a second focal length at the second time point, the second focal length being different from the first focal length.

In an embodiment, the optical system forms, at the first time point, a first virtual image of a first object located at a distance from the optical system, the first virtual image being perceived at a first distance from a viewing position, a first magnification being a ratio of a size of the first virtual image over a size of the first object, the optical system forms, at the second time point, a second virtual image of a second object located at the distance from the optical system, the second virtual image being perceived at a second distance from the viewing position, the second distance being different from the first distance, a second magnification being a ratio of a size of the second virtual image over a size of the second object, and the second magnification is different from the first magnification.

In an example, the first distance is a multiple of the second distance.

In an example, the first light beam passes a first region of the polarization controller, the optical system has a first focal length for the first light beam passing the first region of the polarization controller, the second light beam passes a second region of the polarization controller that is different from the first region, and the optical system has a second focal length for the second light beam passing the second region of the polarization controller, the second focal length being different from the first focal length.

In an example, the optical system forms a first virtual image of a first object located at a distance from the optical system, the first light beam from the first object passing the first region of the polarization controller, the first virtual image being perceived at a first distance from a viewing position, and the optical system forms a second virtual image of a second object located at the distance from the optical system, the second light beam from the second object passing the second region of the polarization controller, the second virtual image being perceived at a second distance from the viewing position, the second distance being different from the first distance.

In an embodiment, a first magnification is a ratio of a size of the first virtual image over a size of the first object, a second magnification is a ratio of a size of the second virtual image over a size of the second object, and the second magnification is different from the first magnification.

An image can be formed based on the first virtual image and the second virtual image.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
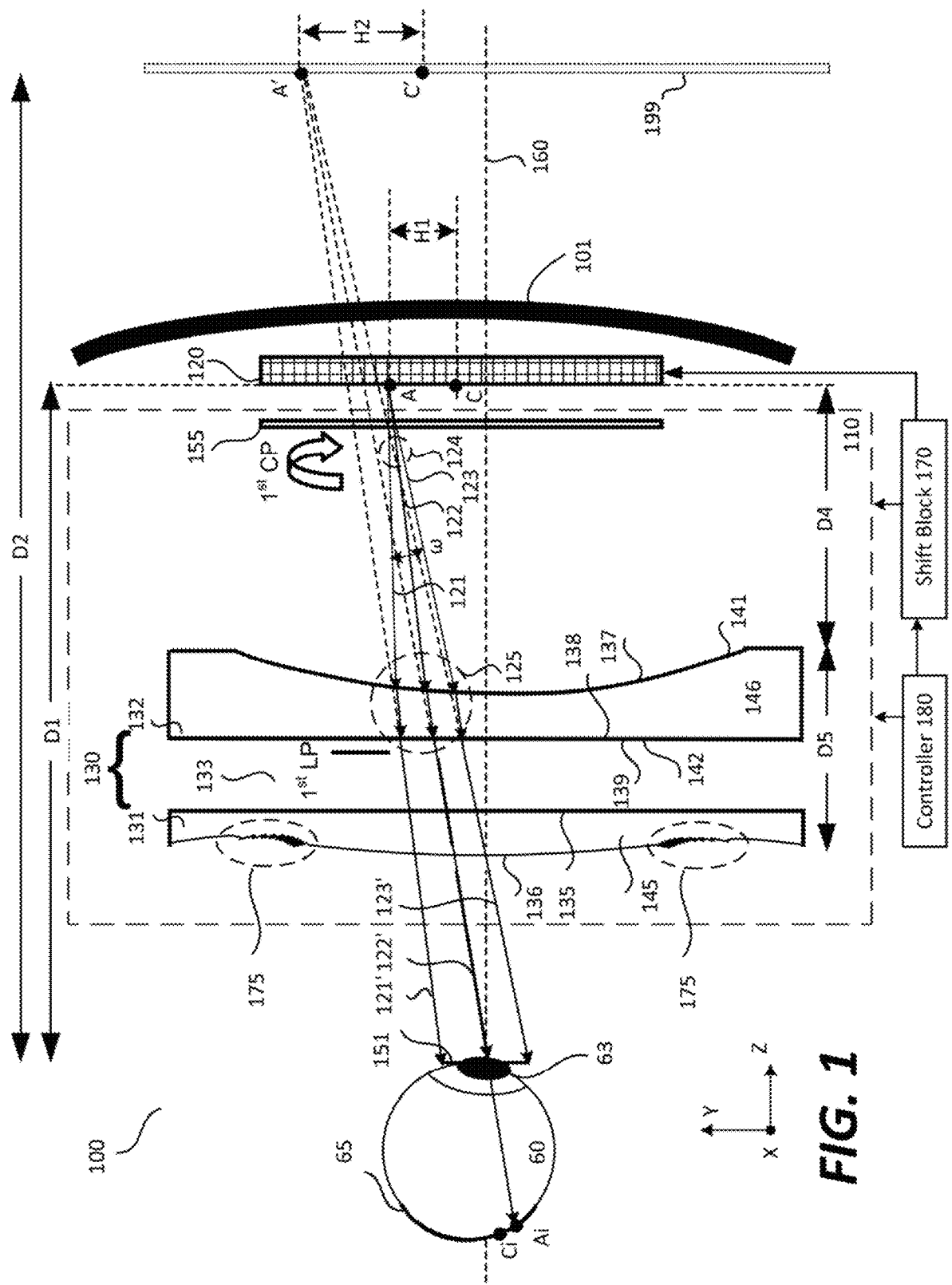
FIG. 1 shows a display system in a side view according to some embodiments of the disclosure.

A display system can include an optical system that directs light beams from a display device or a real object to a viewing position. A light receiver can be positioned at the viewing position to receive the light beams. In an example, the optical system and the display device can be configured to be positioned within a distance threshold (e.g., 35 mm) of an eye of a user, and the display system can be referred to as a near eye display (NED) system. For example, the display system is a head mounted display (HMD) system worn by a user.

The optical system can include one or more lenses. An optical power of the optical system can indicate a degree to which the optical system converges or diverges light, and can be indicated by a focal length f of the optical system. In an example, the optical power of the optical system is equal to a reciprocal of a focal length f of the optical system. A higher optical power indicates (i) a stronger focusing power for a converging optical system or (ii) a stronger diverging power for a diverging optical system. In an example, the optical power and the focal length of the optical system vary with a number of times that a light beam passes through a lens in the one or more lenses.

According to an embodiment of the disclosure, when first light beams incident onto the lens in the one or more lenses has a first polarization state, the first light beams pass through the lens in the one or more lenses N1 times. When second light beams incident onto the lens in the one or more lenses has a second polarization state, the second light beams pass through the lens in the one or more lenses N2 times. N1 and N2 are different positive integers. In an example, N1 is 1 (e.g., shown in FIG. 1), and N2 is 3 (e.g., shown in FIG. 2). In an example, a first focal length of the optical system for the first light beams in the first polarization state is different from a second focal length of the optical system for the second light beams in the second polarization state. The optical system can be configured to form images using the first light beams in the first polarization state in a first imaging mode and to form images using the second light beams in the second polarization state in a second imaging mode. The optical system can be referred to as a dual imaging optical system.

In an example, a 3D glass works by forming two different images for each eye, and a left eye and a right eye of a viewer can see left and right viewpoint images. Different viewpoint images can be reconstructed by a brain into a 3D image. For example, a screen image includes overlapped images projected from two respective projectors, one projector projects an image of a polarization basis (or a polarization state) (e.g., a vertical linear polarization, or a left-hand circular polarization) and another projector projects an image of another polarization basis (e.g., a horizontal liner polarization, or a right-hand circular polarization). A 3D glass can include a pair of glass windows with different polarization filters to allow light having only one appropriate polarization basis to pass through and reach the respective eye.

Figure 2:
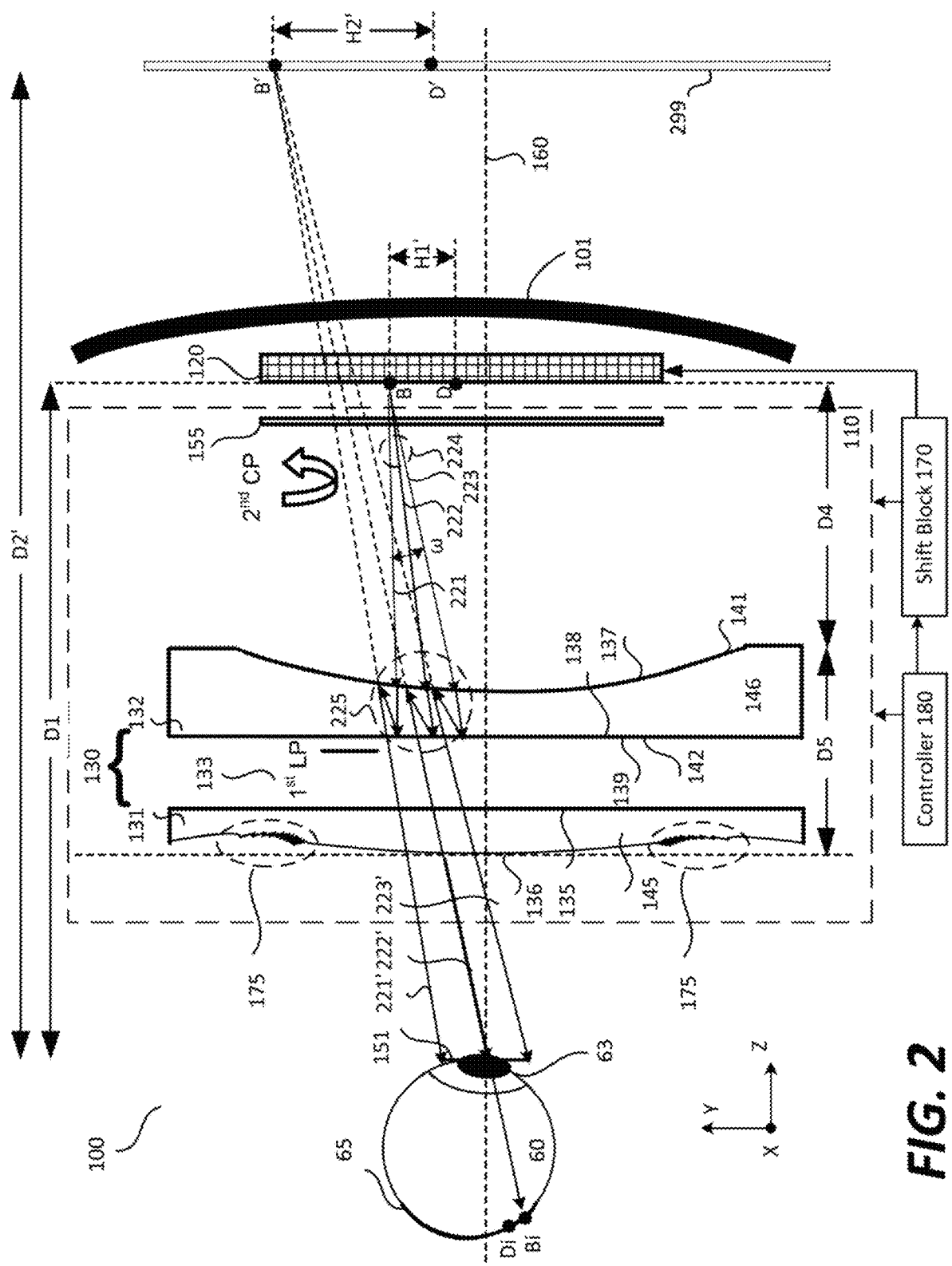
FIG. 2 shows a display system in a side view according to some embodiments of the disclosure.

A dual imaging optical system (e.g., a display system (100) shown in FIGS. 1-2) by multiplexing sources having different polarization bases is described in the disclosure. A display system, such as an optical imaging system for NED can include any suitable optical elements, such as Fresnel/diffractive lens element(s), lenses (e.g., polarization basis dependent lenses), a polarization controller (e.g., a switchable polarization rotator), and/or a display device. The polarization controller (e.g., the switchable polarization rotator) can control a polarization basis used in the display system such that the polarization basis can be one of two polarization states. A first image associated with a first state of polarization basis (or a first polarization state) can be imaged through the optical system (e.g., including a lens system) at a first focal length or a first magnification, and a second image associated with a second state of polarization basis can be imaged through the optical system at a second focal length or a second magnification. The first image and the second image can be multiplexed in a time domain or a spatial domain. In an embodiment, the multiplexing (e.g., in the time domain or the spatial domain) may allow a viewer to see a high resolution image at a low magnification overlapped with a low resolution image at a high magnification to render a high resolution foveated view. In another embodiment, the multiplexing may allow a viewer to see a multi-focal scene or a 3D scene. In another embodiment, the multiplexing may allow a viewer and a content provider to switch focal scenes.

In an embodiment, a specialty glass (e.g., including the display system (100)) is described in the disclosure. A focal length of the specialty glass can be dependent on a polarization basis of light beams used to form an image. When an image associated with one polarization basis is formed by the specialty glass, a viewer can see an image at one image plane (sometimes referred to as a focal plane). When an image associated with another polarization basis is formed by the glass, the viewer can see the image at another image plane. In an example, a viewer can see through the specialty glass and perceives an object about 0.25 m away from the viewer with the one polarization basis, and can see through the specialty glass and perceives the same object about 2 m away from the viewer with the other polarization basis. The specialty glass can be applied in a virtual reality (VR) NED. Since in a VR environment, a user may interact with an object at an arm length (e.g., 0.25 m), or view an object at a comfort viewing distance (e.g., 2 m). By switching between the two polarization bases, the special glass can help the user to interact with objects in a more natural view.

In an embodiment, a magnification of the specialty glass can be dependent on a polarization basis associated with an image. when an image associated with one polarization basis is formed by the glass, a viewer can see the image at a first magnification, and when an image of another polarization basis is formed the glass, the viewer can see the image at a second magnification. In an example, the viewer can see through the specialty glass and perceives an object with details (or a high resolution) spanning a first field of view (FOV) area (e.g., a 10° FOV) with a polarization basis, and the viewer can see through the specialty glass and perceives the same object spanning a second FOV area (e.g., a 100° FOV) associated with another polarization basis. The FOV can indicate an extent of an observable world that is seen or detected by a light receiver (also referred to as an optical sensor), such as an eye. In an example, the FOV is indicated by a solid angle within which the light detector can detect or receive light.

Since a human eye can detect more than 30 cycles per degree (CPD), or 60 pixels per degree (PPD) resolution, for a narrow FOV (e.g., the first FOV, such as less than) 10°, there is no need to generate a high resolution image (e.g., an image with the 60 PPD) for a large FOV (e.g., the second FOV such as) 100°. Thus, a high resolution image covering the first FOV (e.g., a 10° FOV) can be generated under one polarization basis and a same display system (e.g., the specialty glass) can be used to generate a low resolution image to cover the second FOV (e.g., a 100° FOV) under another polarization basis. A foveated image can be generated based on the high resolution image and the low resolution image. In an example, an overlap of the high resolution image and the low resolution image can generate the foveated image. By switching between the two polarization bases, the specially glass can generate the foveated image using a time multiplexing or a spatial multiplexing.

Various optical elements can be used in an NED optical system. Refractive optical elements can use refractive and geometric structure of lens materials to provide an optical power. A Fresnel lens surface can replace a curved surface of an refractive optical element (e.g., a lens) with a series of concentric grooves to provide the Fresnel lens with a similar or an identical focal length as that of a non-Fresnel lens but in a compact form. In an example, an extruded profile of a Fresnel lens is like a refractive optics surface profile. A diffractive optical element (DOE) can include a phase lens comprising microstructures to diffract light into a pattern and provide a lens optical power. A reflective/catoptric optical system can use curved mirror(s) to reflect light and form an image. Refractive optical elements and diffractive optical elements can be sensitive to wavelengths, for example, due to material dispersion. Reflective optical elements can be weakly wavelength dependent. In an example, reflective optical elements are less wavelength dependent than refractive optical elements and diffractive optical elements. A catadioptric optical system can use both reflective optical elements and refractive optical elements to improve an imaging power.

An optical system (e.g., an optical system (110) in FIGS. 1-2) comprising a catadioptric optical subsystem and optionally including other optical subsystem(s) including Fresnel optical element(s) or DOE optical element(s) are described.

The catadioptric optical elements can be dependent on a polarization basis of input light beams into the optical system. When an input light beam has one polarization basis, the input light beam is not folded by a reflective optical cavity, and the optical system can provide an optical power. When an input light beam has another polarization basis, the input light beam can be folded by the reflective optical cavity to provide another optical power.

FIGS. 1-2 shows the display system (e.g., a near eye display system) (100) in a side view according to some embodiments of the disclosure. The display system (100) includes the optical system (110), a shift block (170), and a controller (180). In an example, the display system (100) includes a display device (120) and a polarization controller (e.g., a polarization rotator or a switchable polarization rotator) (155).

The optical system (110) can include any suitable optical elements, such as diffractive elements (e.g., gratings), refractive elements (e.g., lenses), guiding elements (e.g., planar waveguides and/or fibers), and polarizing elements (e.g., polarizers, half-wave plates, quarter-wave plates, polarization rotators, Pancharatnam-Berry (PB) Phase lens, and the like). The optical system (110) can include a lens system (130), a beam splitter (141), and a reflective polarizer (139). In an example, the optical system (110) includes a wave plate, such as a quarter-wave plate (QWP) (142). The display device (120) can include a pixel array configured to emit light beams and display images. The polarization controller (155) can be configured to control polarization states of light beams incident onto the polarization controller (155) such that a polarization state of each light beam passing through the polarization controller has one of a first polarization state (e.g., a first circular polarization state or $1^{st}$ CP) and a second polarization state (e.g., a second circular polarization state or $2^{nd}$ CP). In an example, the polarization controller (155) is integrated with the display device (120), and is a component of the display device (120). In an example, such as shown in FIGS. 1-2, the polarization controller (155) is positioned outside the display device (120), and the optical system (110) can include the polarization controller (155).

The optical system (110) can be disposed between the display device (120) and a viewing position. The optical system (110) can direct the emitted light beams from the display device (120) or light beams from a real object to the viewing position, such as an area (151) at the viewing position. In an example, the area (151) is located in an XY plane, and is referred to as an exit pupil of the optical system (110). The XY plane includes an X axis and a Y axis that is orthogonal to the X axis. A light receiver or detector, such as an eye (60) of a user or the like, can be located at the area (151).

The lens system (130) can include one or more lenses, such as a first lens (131) and a second lens (132). The first lens (131) can include an optically transparent member (145) having two opposite surfaces (135)-(136). The second lens (132) can include an optically transparent member (146) having two opposite surfaces (137)-(138). The second lens (132) can be disposed between the first lens (131) and the polarization controller (155). In an example, the first lens (131) can be referred to as an eye lens according to a proximity to the area (151) (e.g., the eye (60)), and the second lens (132) can be referred to as a display lens according to a proximity to the display device (120).

Surfaces of the one or more lenses in the lens system (130), such as the surfaces (135)-(138), can have any suitable shapes or surface curvatures, such as planar shape(s)

parallel to the XY plane, spheric shape(s) with any suitable radius of curvature, aspheric shape(s), or other shape(s). One or more of the surfaces (135)-(138) can be smooth. One or more of the surfaces (135)-(138) can be grooved, for example, including a microstructure, such as a Fresnel structure. In an example, the surface (136) is grooved to include a Fresnel structure. Shapes of the surfaces (135)-(138) can be determined based on design parameters, such as focal lengths, aberration requirements, lens thicknesses, flatness(es) of the lenses, and the like.

In an example, the first lens (131) is a converging lens having a positive focal length, and the second lens (132) is a diverging lens having a negative focal length. An optical axis (160) of the lens system (130) can be parallel to a Z axis that is perpendicular to the XY plane. The first lens (131) and the second lens (132) can have circular symmetry around the optical axis (160). The first lens (131) and the second lens (132) can be separated by a gap (133). In an example, the gap (133) is larger than 0. In another example, a portion of the first lens (131) is in contact with a portion of the second lens (132), for example, the smallest distance between the first lens (131) and the second lens (132) is zero.

The optically transparent members (145)-(146) can include any suitable material(s) including but not limited to glass (e.g., borosilicate glass, dense flint glass), polymer, plastic material(s), such as poly(methyl methacrylate) (PMMA), polyimide, acrylic, styrene, cyclic olefin polymer, cyclic olefin co-polymer, polycarbonate, and/or the like. A glass lens can be fabricated by grinding and polishing, a glass molding method, and/or the like. A polymer or plastic lens can be fabricated by diamond turning, polishing, injection molding, casting, and/or the like.

The BS (141) and the reflective polarizer (139) can be disposed between the area (151) and the polarization controller (155). The quarter-wave plate (142) can be disposed between the beam splitter (141) and the reflective polarizer (139). Anti-reflection (AR) coating(s) can be applied to any suitable surface(s) of the optical system (110) to reduce unwanted reflections of the light beams, for example, to reduce or eliminate ghosting due to the multi-reflections at various interfaces. The BS (141), the reflective polarizer (139), and/or the quarter-wave plate (142) can be thin-film optical component(s), for example, including one or more layers of optical films. A thickness (e.g., a maximum thickness or an average thickness) of a thin-film optical component (e.g., the BS (141), the reflective polarizer (139), or the quarter-wave plate (142)) can be less than a thickness threshold, such as 500 microns, 200 microns, 100 microns, or the like. A thin-film optical component (e.g., the BS (141), the reflective polarizer (139), or the quarter-wave plate (142)) can be disposed onto a surface of the first lens (131) or the second lens (132). A shape of the thin-film optical component (e.g., the BS (141), the reflective polarizer (139), or the quarter-wave plate (142)) can conform substantially or completely to a shape of a surface of the first lens (131) or the second lens (132).

Referring to FIGS. 1-2, the beam splitter (141) is positioned between the second lens (132) and the display device (120), the reflective polarizer (139) is positioned between the first lens (131) and the second lens (132), and the QWP (142) is positioned between the beam splitter (141) and the reflective polarizer (139).

The reflective polarizer (139) can be configured to pass through a light beam having a first linear polarization state ($1^{st}$ LP) and reflect a light beam having a second linear polarization state ($2^{nd}$ LP). The reflective polarizer (139) can also be referred to as a reflective polarizer mirror. The second linear polarization state is orthogonal to the first linear polarization state. In an example, the reflective polarizer (139) can be formed on the surface (138) in the lens system (130). A shape of the reflective polarizer (139) can conform substantially or completely to a shape of the surface (138) of the second lens (132). In the example shown in FIGS. 1-2, the surface (138) of the second lens (132) is planar, and thus a shape of the reflective polarizer (139) is planar.

The reflective polarizer mirror (139) in pancake lenses (e.g., the lens system (130)) can be fabricated using polymeric, birefringent, multi-layer reflective polarizers to achieve high-quality, such as a high reflectance (e.g., the high average reflectance) in the block direction (in the block state), a high transmittance (e.g., the high average transmittance) in the pass direction (in the pass state), a low haze, a low scattering lens with a smooth surface finish (or a relatively small surface roughness) and a low orange peel or waviness.

The beam splitter (141) can be configured to partially transmit and partially reflect light beams incident onto the beam splitter (141). The beam splitter (141) can have an average optical transmittance T and an average optical reflectance R. In an example, a sum of T and R is 1 (i.e., 100%) over a wavelength range (e.g., 380 to 780 nanometers (nm)). The average optical transmittance T and the average optical reflectance R of the beam splitter (141) can be referred to as T/R. T or R can be in a range (e.g., from 40% to 60%). In an example, the beam splitter (141) has T/R of 40/60, 50/50, or 60/40. For example, if T and R are 50%, the beam splitter (141) transmits 50% and reflects 50% of the light beams incident onto the beam splitter (141). The beam splitter (141) partially transmits and partially reflects light beams from the display device (120). In an example, the BS (141) is disposed onto the surface (137) of the second lens (132). The surface (137) of the second lens (132) can have any suitable shape, such as aspheric or spheric. A shape of the BS (141) can conform substantially or completely to a shape (e.g., a spheric shape or an aspheric shape) of the surface (137) of the second lens (132).

A polarization state of a light beam can be altered as the light beam passes through certain optical elements. In an embodiment, a polarization state of a light beam can be altered by a waveplate or a retarder as the light beam travels through the waveplate. The quarter-wave plate (142) can alter a polarization state of a light beam traveling through the quarter-wave plate (142), for example, by 90° or π/2. In an example, the quarter-wave plate (142) converts linearly polarized light into circularly polarized light or circularly polarized light into linearly polarized light. The quarter-wave plate (142) can be formed on the surface (138) in the lens system (130). In an example, the quarter-wave plate (142) is formed on the surface (138), and the reflective polarizer (139) is formed over the quarter-wave plate (142).

A light beam can be randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam (e.g., the light beam generated from each pixel in the display device (120)) can have any suitable polarization state(s) or DOP. In an example, the light beam is circularly polarized having a DOP of 100%. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam in the disclosure. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam in the disclosure.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface.

Each pixel in the pixel array of the display device (120) can generate a light beam. A light beam from a respective pixel in the display device (120) can include a bundle of light rays in any suitable directions. Referring to FIG. 1, for example, a pixel A on the display device (120) emits a light beam (one of the first light beams) including a bundle of light rays in suitable directions. A subset (124) of the light rays in the light beam can be directed by the optical system (110) to the area (151). An angular span of the subset (124) of the light beam can be determined based on an acceptance angle ω of the optical system (110). Three light rays (121)-(123) of the subset (124) of the light beam are shown in FIG. 1. The three light rays (121)-(123) can include boundary rays (121) and (123) and a center ray (122).

A light beam generated by a pixel in the display device (120) can have any suitable polarization state, such as circularly polarized or linearly polarized. The polarization controller (155) can be employed to manipulate a polarization state of the light beam generated by a pixel in the display device (120). In an embodiment, the polarization controller (155) is integrated with the display device (120), and is a component of the display device (120). In an embodiment, the polarization controller (155) is positioned next to the display device (120).

An optical cavity can be formed between the beam splitter (141) and the reflective polarizer (139). In the example shown in FIGS. 1 and 2, the optical cavity can include the second lens (132) and the QWP (142). According to an embodiment of the disclosure, the optical system (110) can direct light beams, for example, from the display device (120), to the viewing position, such as the area (151), in multiple imaging modes based on respective polarization states of the light beams that are incident onto the optical cavity. In an embodiment, the multiple imaging modes includes two imaging modes, such as a first imaging mode shown in FIG. 1 and a second imaging mode shown in FIG. 2.

Various configurations of an optical cavity (e.g., a reflective optical cavity) can be considered. In an example, the optical cavity includes a single lens. In an example, a cemented double design may include two lenses bonded together. An air-gap design may include two or more lenses. An air-gap design may introduce more surfaces into the optical cavity formed by two mirrors. The additional surfaces inside the optical cavity can act as additional mirrors to form ghost images which intensities can be reduced with AR coating(s). The air-gap design can allow more optical surfaces for a more flexible optical design with a trade-off of more ghost images. Referring to FIGS. 1-2, the optical cavity includes the second lens (132), the descriptions can be suitably adapted if the optical cavity includes one or more lenses, such as the first lens (131).

FIG. 1 shows an example of the first imaging mode. In an embodiment, one of the first light beams (e.g., a first light beam including the rays (121)-(123) from the pixel A) from the display device (120) has the first polarization state after passing through the polarization controller (155), the first light beam with the first polarization state is incident onto the beam splitter (141). After passing through the beam splitter (141), the first light beam with the first polarization state is incident onto the optical cavity. The first light beam can pass through the optical cavity (e.g., including the second lens (132) and the QWP (142)) only one time, such as shown by an unfolded path (125). Subsequently, the first light beam passes through the reflective polarizer (139) and the first lens (131) one time, and is incident onto the area (151) as indicated by rays (121')-(123') that correspond to the rays (121)-(123), respectively.

FIG. 2 shows an example of the second imaging mode. In an embodiment, one of the second light beams (e.g., a second light beam including rays (221)-(223) from a pixel B) from the display device (120) has a second polarization state after passing through the polarization controller (155), the second light beam with the second polarization state is incident onto the beam splitter (141). The rays (221)-(223) can include boundary rays (221) and (223) and a center ray (222) in a subset (224) of the second light beam. The descriptions of the first light beam including the rays (121)-(123) from the pixel A in FIG. 1 can be suitably adapted to describe the second light beam including the rays (221)-(223) from the pixel B. In an example, the first light beam from the pixel A and the second light beam from the pixel B have different polarization states out of the polarization controller (155). After passing through the beam splitter (141), the second light beam with the second polarization state is incident onto the optical cavity. The second light beam can pass through the optical cavity (e.g., including the second lens (132) and the QWP (142)) multiple times (e.g., three times), such as shown by a folded path (225). Subsequently, the first light beam passes through the first lens (131) one time, and is incident onto the area (151) as indicated by rays (221')-(223') that correspond to the rays (221)-(223), respectively.

The second polarization state can be different from the first polarization state. In an example, the second polarization state is orthogonal to the first polarization state.

Comparing the first imaging mode and the second imaging mode, a first light path (or a first optical path) of the first light beam from the display device (120) to the area (151) in FIG. 1 can be different from a second light path of the second light beam from the display device (120) to the area (151) in FIG. 2. The second light path can pass through the optical cavity (e.g., including the second lens (132)) more times than the first light path. As the second light path passes through a lens (e.g., the second lens (132)) more times and thus experience additional refractions at surfaces of the lens, a first focal length of the optical system (110) associated with the first polarization state of the first light beam out of the polarization controller (155) can be different from a second focal length of the optical system (110) associated with the second polarization state of the second light beam out of the polarization controller (155).

In the example shown in FIG. 1, the optical system (110) can convert the light rays (121)-(123) in the first light beam into the light rays (121')-(123'), respectively. An extension of the light rays (121')-(123') can intersect at a point A' on an image plane (199). The optical system (110) can form an image (e.g., the point A') from an object (e.g., the pixel A on the display device (120)). The image A' can be a virtual image formed by the optical system (110) as the image A' is an intersection of the extension of the light rays (121')-(123'), for example, the light rays (121')-(123') do not intersect at the point A'. In an example, a lens (63) in the eye (60) forms an image Ai on a retina (65) of the eye (60) based on the light rays (121')-(123'), and thus the eye (60) perceives the object (e.g., the pixel A) on the display device (120) as the point A' located at the image plane (199).

Similarly, a light beam from another pixel (e.g., a pixel C) on the display device (120) has the first polarization state, and can pass through the optical cavity only one time. The pixel C can be imaged by the optical system (110) as an image (e.g., a point) C' on the image plane (199). In the example shown in FIG. 1, the optical system (110) can form an image (e.g., a virtual image) C'A' at the image plane (199) from an object CA on the display device (120). The lens (63) in the eye (60) can form an image CiAi on the retina (65) based on the virtual image C'A', and thus the eye (60) perceives the object OA displayed on the display device (120) as the virtual image C'A' located at the image plane (199).

The virtual image C'A' appears at a distance (e.g., a first image distance) D2 from the area (151) located at the viewing position and appears larger than the object CA on the display device (120). The distance D2 is larger, and in some cases much larger, than a distance D1 between the area (151) and the display device (120). A magnification of an optical system can be indicated by a ratio of an image size over an object size. Referring to FIG. 1, a first magnification of the optical system (110) associated with light beams having the first polarization state can be indicated as a ratio of an image size (e.g., a height) H2 of the virtual image C'A' over an object size (e.g., a height) H1 of the object CA.

A polarization state of a light beam can vary after passing a certain optical element (e.g., (155) or (142)) that can change the polarization state of the light beam. In an example shown in FIG. 1, the first polarization state of the first light beams used in the first imaging mode can refer to a polarization state of the first light beams coming out of the polarization controller (155) and prior to incident onto the reflective polarizer (139), which can also be the polarization state of the first light beams incident onto the optical cavity or the beam splitter (141). In an example shown in FIG. 2, the second polarization state of the second light beams used in the second imaging mode can refer to a polarization state of the second light beams coming out of the polarization controller (155) and prior to incident onto the reflective polarizer (139) for the first time, which can also be the polarization state of the second light beams incident onto the beam splitter (141) for the first time or the optical cavity.

The above description can be adapted to the second polarization state. Referring to FIG. 2, the optical system (110) can convert the light rays (221)-(223) in the second light beam into the light rays (221')-(223'), respectively. An extension of the light rays (221')-(223') can intersect at a point B' on an image plane (299). The optical system (110) can form an image (e.g., the point B') from an object (e.g., the pixel B on the display device (120)). The image B' can be a virtual image formed by the optical system (110) as the image B' is an intersection of the extension of the light rays (221')-(223'). In an example, the lens (63) forms an image Bi on the retina (65) based on the light rays (221')-(223'), and thus the eye (60) perceives an object (e.g., the pixel B) on the display device (120) as the image B' located at the image plane (299).

Similarly, another one of the second light beams from another pixel (e.g., the pixel D) on the display device (120) has the second polarization state, and can pass through the optical cavity multiple times (e.g., three times). The pixel D can be imaged by the optical system (110) as an image (e.g., a point) D' on the image plane (299). In the example shown in FIG. 2, the optical system (110) can form an image (e.g., a virtual image) D'B' at the image plane (299) from an object DB on the display device (120). The lens (63) can form an image DiBi on the retina (65) based on the virtual image D'B', and thus the eye (60) perceives the object DB displayed on the display device (120) as the virtual image D'B' located at the image plane (299).

The virtual image D'B' appears at a distance (e.g., a second image distance) D2' from the area (151) located at the viewing position and appears larger than the object DB on the display device (120). The distance D2' is larger, and in some cases much larger, than the distance D1 between the area (151) and the display device (120). Referring to FIG. 2, a second magnification of the optical system (110) associated with light beams having the second polarization state can be indicated as a ratio of an image size (e.g., a height) H2' of the virtual image D'B' over an object size (e.g., a height) H1' of the object DB.

According to an embodiment of the disclosure, the first magnification can be different from the second magnification. In an example, the second magnification is larger than the first magnification. According to an embodiment of the disclosure, the first image distance D2 can be different from the second image distance D2'. In an example, the second image distance D2' (e.g., 2 meters (m)) is larger than the first image distance D2 (e.g., 0.25 m).

As described with reference to FIGS. 1 and 2, a focal length of an optical system (e.g., (110)) can depend on a polarization state of a light beam, such as the first light beam or the second light beam incident onto the beam splitter (141) or the optical cavity. A magnification of an optical system (e.g., (110)) can depend on a polarization state of a light beam, such as the first light beam or the second light beam incident onto the beam splitter (141) or the optical cavity.

Examples of the first light path of the first light beam (FIG. 1) and the second light path of the second light beam (FIG. 2) are described with reference to FIGS. 1 and 2, respectively. Referring to FIG. 1, the first light beam from the pixel A in the display device (120) can pass through the polarization controller (155), and the first light beam can have the first polarization state coming out of the polarization controller (155). In an example, the first polarization state is the $1^{st}$ CP. The first light beam can be partially transmitted by the beam splitter (141). Subsequently, the first light beam passes the optical cavity once. For example, the first light beam passes the second lens (132) once and is incident onto the QWP (142). The QWP (142) can manipulate the first polarization state (e.g., the $1^{st}$ CP) of the first light beam into a polarization state such that the reflective polarizer (139) transmits the first light beam with the polarization state with a relatively high transmittance. For example, the QWP (142) manipulates the $1^{st}$ CP into a first linear polarization state ($1^{st}$ LP). The first light beam with the $1^{st}$ LP can be incident onto the reflective polarizer (139). In an example, the first linear polarization state is parallel to a transmission direction of the reflective polarizer (139). Thus, the reflective polarizer (139) transmits the first light beam having the $1^{st}$ LP such that the rays (121)-(123) are directed to the area (151) with a relatively high transmittance that is above or equal to a value (e.g., 90%) over a wavelength range (e.g., 380 to 780 nm). Thus, pixels from the display device (120) emitting the first light beams can have the first polarization state out of the polarization controller (155), and can pass the optical cavity only once. The pixels can be imaged onto the image plane (199) in the first imaging mode. An image (e.g., formed based on the pixels) displayed by the display device (120) can be imaged by the display system (100) onto the image plane (199), and the eye (60) can perceive a virtual image on the image plane (199) which is larger and is further away from the eye (60) than the image displayed by the display device (120).

A resolution of an optical system can indicate an ability of the optical system to distinguish object detail. In an example, the resolution is expressed in terms of line-pairs per millimeter (lp/mm) where a line-pair is a sequence of one black line and one white line. A contrast or a modulation of an image can be defined as contrast (%)=$(I_{max}-I_{min})/(I_{max}+I_{min})$ where $I_{max}$ and $I_{min}$ represent a maximal intensity and a minimal intensity of the image, respectively.

One parameter that indicates the performance of an optical system is a modulation transfer function (MTF). The MTF of the optical system can indicate an ability of the optical system to transfer a contrast at a particular resolution from an object to an image of the object. In an example, the MTF incorporates the resolution and the contrast into a single parameter. As line spacing decreases (e.g., the resolution increases), it becomes increasingly difficult for the optical system to efficiently transfer the decrease in contrast. Thus, the MTF decreases.

Sagittal lines used in determining an MTF can refer to lines radiating from a center to an image circle periphery. Tangential (or meridional) lines are perpendicular to the sagittal lines. Because an optical system may not focus lines of both directions equally on a same plane, sagittal and tangential measurements for the same optical system can differ. An MTF can be a sagittal MTF if the sagittal lines are used to determine the MTF or a tangential MTF if the tangential lines are used to determine the MTF.

Figure 3:
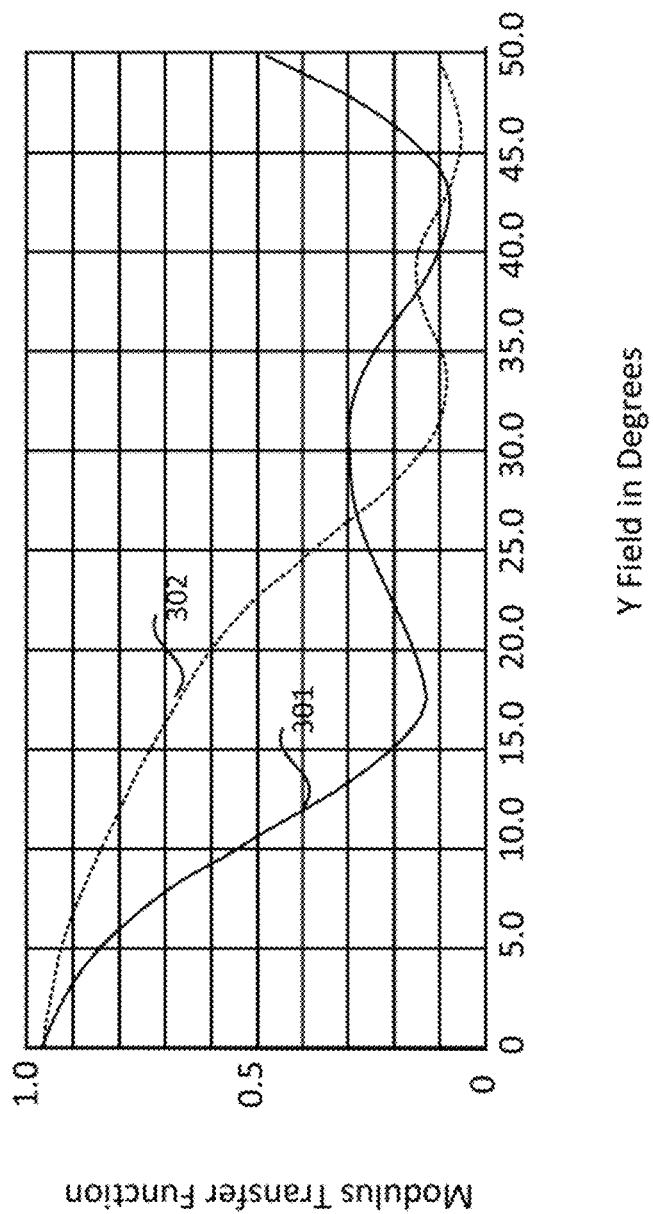
FIG. 3 shows a modulation transfer function (MTF) of an optical system according to an embodiment of the disclosure.

FIG. 3 shows an MTF of the optical system (110) in the first imaging mode shown in FIG. 1. In an example, the eye (60) is positioned at the area (151) with a gaze straight ahead without rotation (e.g., the field angle or eye rotation is 0°). FIG. 3 shows a tangential MTF (301) and a sagittal MTF (302) versus a field angle (e.g., a Y field from 0° to 50° at a resolution of 10 lp/mm (or 10 cycles/mm). FIG. 3 indicates that a FOV of the first imaging mode is 100°.

Figure 4:
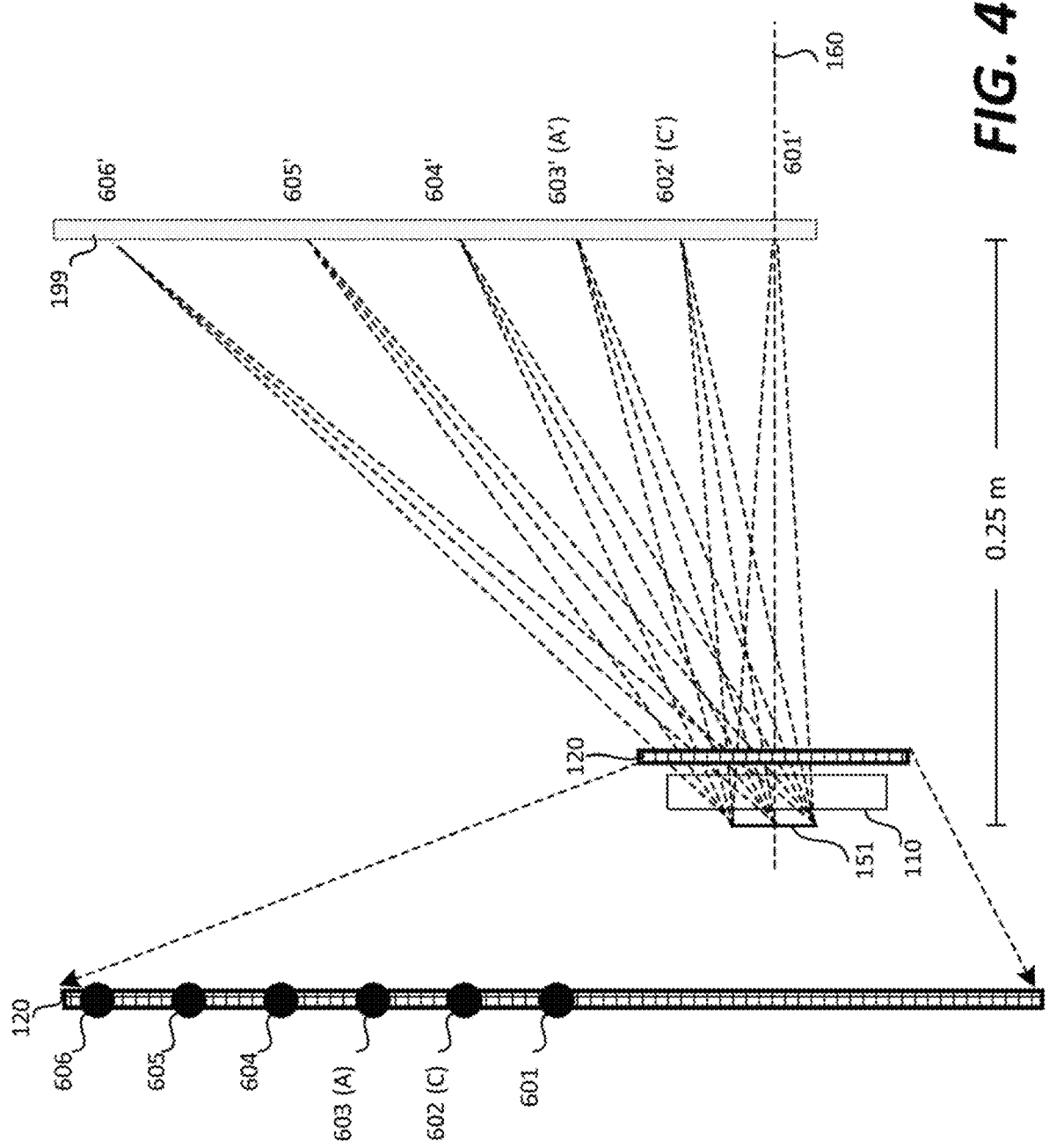
FIG. 4 shows exemplary virtual image points corresponding to pixels on a display device according to an embodiment of the disclosure.

In an example, the distance (e.g., the first virtual image distance) D2 from the area (151) and the image plane (199) is 0.25 m. FIG. 4 shows exemplary virtual image points (601')-(606') formed in the first imaging mode by the optical system (110) corresponding to object points or pixels (601)-(606) on the display device (120) according to an embodiment of the disclosure. Light beams from the pixels (601)-(606) can have the first polarization state when the light beams come out of the polarization controller (155), and the light beams can be directed by the optical system (110) in the same way or similarly as described above with reference to the first light beam from the pixel A. Extensions of rays incident onto the area (151) from the pixels (601)-(606) can form the virtual image points (601')-(606') on the image plane (199), respectively. In an example, the point (602) is the pixel C on the display device (120), and the virtual image point (602') is the virtual image point C' shown in FIG. 1. The point (603) is the pixel A on the display device (120), and the virtual image point (603') is the virtual image point A' shown in FIG. 1. In an example, the field angle corresponding to the virtual image point (601') is 0°. The field angle corresponding to the virtual image point (606') can be 50°, which corresponds to a FOV of 100° for the first imaging mode.

Referring to FIG. 2, the second light beam from the pixel B in the display device (120) can pass through the polarization controller (155), and the second light beam can have the second polarization state coming out of the polarization controller (155). The second polarization state can be orthogonal to the first polarization state. In an example, the second polarization state is the $2^{nd}$ CP. The $1^{st}$ CP and the $2^{nd}$ CP can include a left-handed circular polarization state and a right-handed circular polarization state. The second light beam can be partially transmitted by the beam splitter (141). According to an embodiment of the disclosure, the second polarization state of the second light beam coming from the polarization controller (155) is such that the second light beam is reflected by the reflective polarizer (139) after a first pass in the optical cavity, and the second light beam is in another polarization state and is transmitted by the reflective polarizer (139) after passing the optical cavity for a third time.

The optical system (110) in FIG. 2 may be referred to as a folded optical system. As light beams are reflected in the optical cavity between the beam splitter (141) and the reflective polarizer (139), and travel multiple times (e.g., three times) in the optical cavity, the second optical path between the display device (120) and the area (151) includes the folded path (225) between the beam splitter (141) and the reflective polarizer (139). The folding of the second optical path can allow the distance D1 to be decreased, and the display system (100) including the optical system (110) can be used as a NED system. In an example, the lens system (130) is designed to have a relatively small thickness D5, and may be referred to as a pancake lens system.

Referring to FIG. 2, the second light beam (including the rays (221)-(223)) emitted from the pixel B of the display device (120) is partially transmitted by the beam splitter (141). Subsequently, the second light beam passes the optical cavity for a first time where the second light beam sequentially passes through the second lens (132) and the QWP (142). The second light beam can be incident onto the reflective polarizer (139) for the first time. The second light beam is then reflected back into the optical cavity by the reflective polarizer (139). Subsequently, the second light beam passes the optical cavity for a second time where the second light beam sequentially passes through the QWP (142) and the second lens (132).

After the second light beam passes the optical cavity for the second time, the second light beam is partially reflected back into the optical cavity by the beam splitter (141). Subsequently, the second light beam passes the optical cavity for a third time where the second light beam sequentially passes through the second lens (132) and the QWP (142). Then, the second light beam is transmitted by the reflective polarizer (139) and travels to the area (151). In an example, the second light beam (e.g., including the rays (221')-(223')) is focused by the lens (63) of the eye (60) onto the retina (65), and the eye (60) perceives the second light beam as if the second light beam is from the virtual point B' on the image plane (299).

Referring to FIG. 2, in an example, the second light beam has the second polarization state, such as the $2^{nd}$ CP, coming out of the polarization controller (155). The second light beam can be partially transmitted by the beam splitter (141). Then the second light beam passes the optical cavity for the first time as described above. During the first pass, the $2^{nd}$ CP of the second light beam is converted to a second linear polarization state ($2^{nd}$ LP) by the QWP (142). The $2^{nd}$ LP can be orthogonal to the $1^{st}$ LP. The second linear polarization state is along a block direction of the reflective polarizer (139). The block direction of the reflective polarizer (139) refers to a direction where if an electric field vector of a light beam is along the block direction, the light beam is blocked by the reflective polarizer (139) and is not transmitted through the reflective polarizer (139). The reflective polarizer (139) reflects the second light beam having the second linear polarization state, for example, with a relatively high average reflectance that is above or equal to a value (e.g., 90%) over a wavelength range (e.g., 380 to 780 nm). Then the second light beam passes the optical cavity for the second time as described above, and the second light beam is partially reflected by the beam splitter (141). Subsequently, the second light beam passes the optical cavity for the third time as described above. During both the second pass and the third pass, the QWP (142) alters the polarization state of the second light beam. Accordingly, the second linear polarization state of the second light beam is converted to the first linear polarization state that is parallel to a transmission direction of the reflective polarizer (139). Thus, the reflective polarizer (139) transmits the second light beam having the first linear polarization state such that the second light beam is directed to the area (151) with a relatively high transmittance that is above or equal to a value (e.g., 90%) over a wavelength range (e.g., 380 to 780 nm). Referring to FIG. 2, the second optical path includes the folded path (225) between the reflective polarizer (139) and the beam splitter (141) due to the polarization change.

Figure 5:
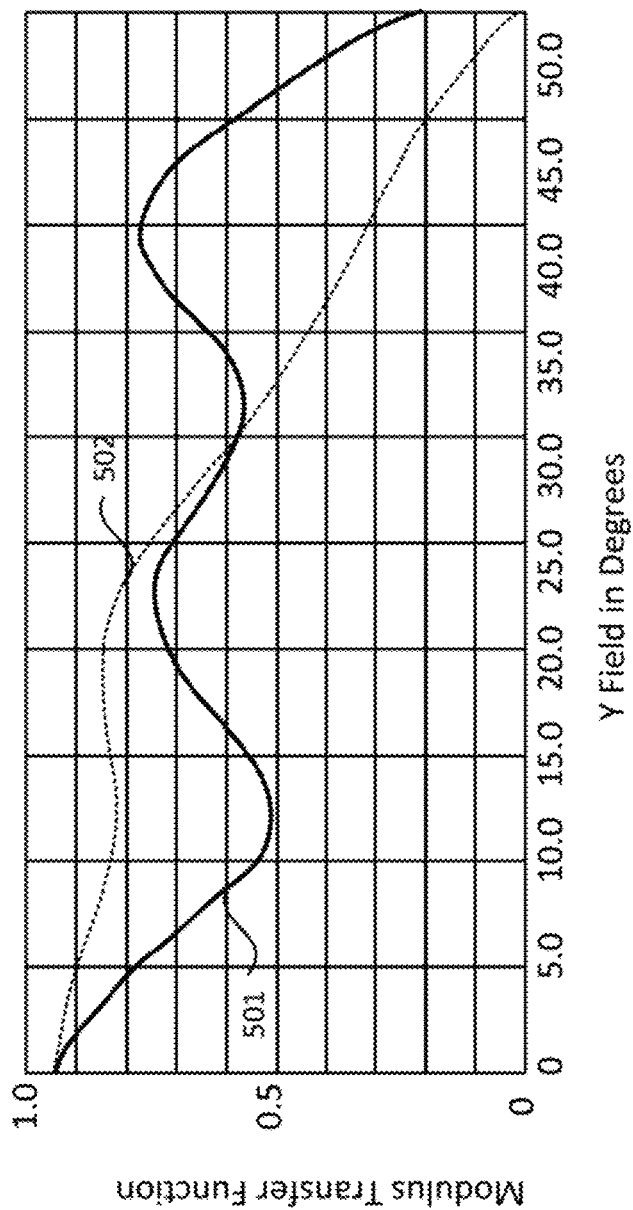
FIG. 5 shows an MTF of an optical system according to an embodiment of the disclosure.

FIG. 5 shows an MTF of the optical system (110) in the second imaging mode shown in FIG. 2. In an example, the eye (60) is positioned at the area (151) with a gaze straight ahead without rotation (e.g., the field angle or eye rotation is 0°). FIG. 5 shows a tangential MTF (501) and a sagittal MTF (502) versus a field angle (e.g., a Y field from 0° to 50°) at a resolution of 10 lp/mm (or 10 cycles/mm). FIG. 5 indicates that a FOV in the second imaging mode is 100°.

Figure 6:
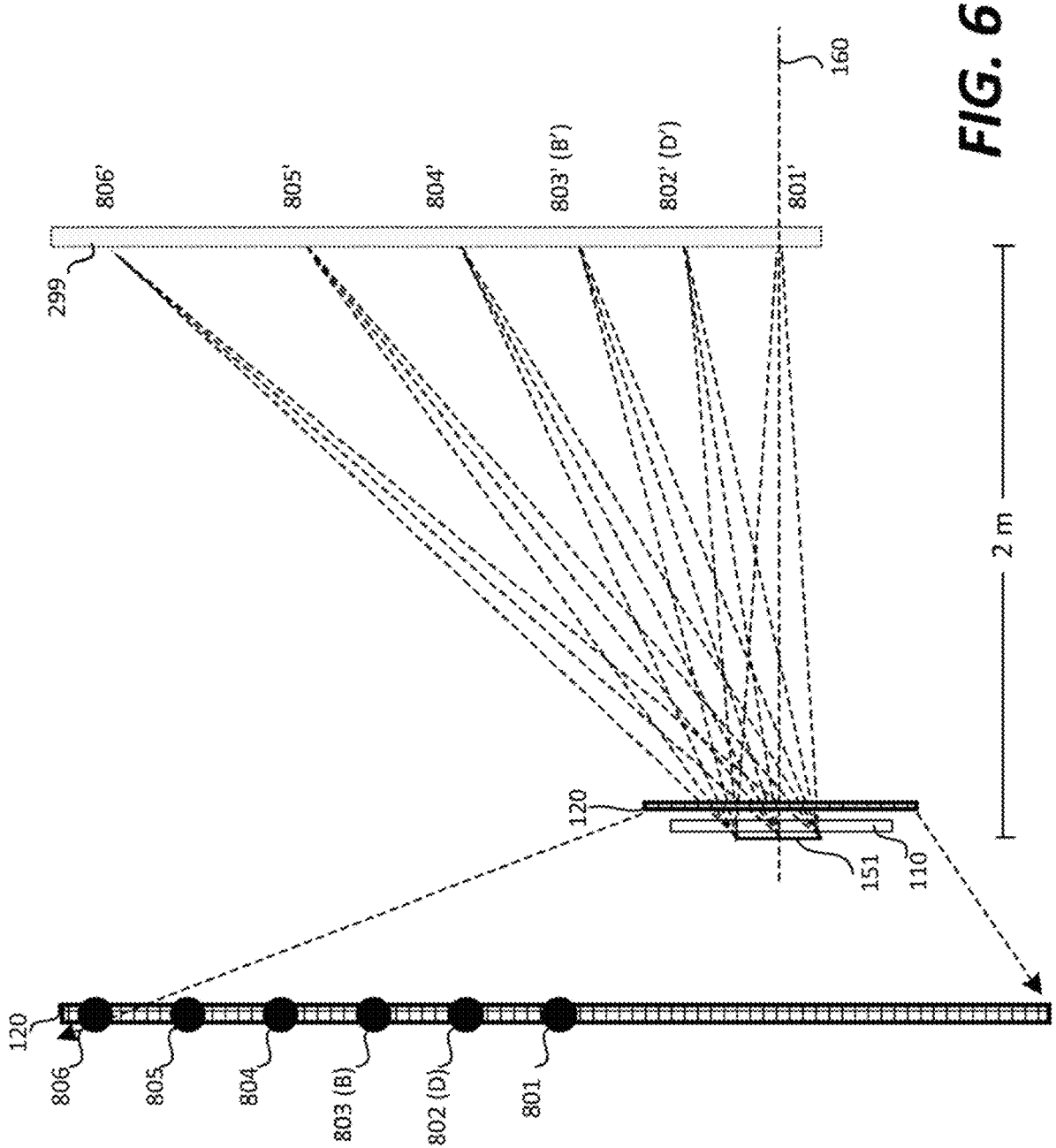
FIG. 6 shows exemplary virtual image points corresponding to pixels on a display device according to an embodiment of the disclosure.

Referring to FIGS. 2 and 6, in an example, the distance (e.g., the second virtual image distance) D2' from the area (151) and the image plane (299) is 2 m. FIG. 6 shows exemplary virtual image points (801')-(806') formed in the second imaging mode by the optical system (110) corresponding to object points or pixels (801)-(806) on the display device (120) according to an embodiment of the disclosure. Light beams from the pixels (801)-(806) can have the second polarization state when the light beams come out of the polarization controller (155), and the light beams can be directed by the optical system (110) in the same way or similarly as described above with reference to the second light beam from the pixel B. Extensions of rays incident onto the area (151) from the pixels (801)-(806) can form the virtual image points (801')-(806') on the image plane (299), respectively. In an example, the point (802) is the pixel D on the display device (120), and the virtual image point (802') is the virtual image point D' shown in FIG. 2. The point (803) is the pixel B on the display device (120), and the virtual image point (803') is the virtual image point B' shown in FIG. 2. In an example, the field angle corresponding to the virtual image point (801') is 0°. The field angle corresponding to the virtual image point (806') can be 50°, which corresponds to a FOV of 100° for the second imaging mode.

Comparing the two imaging modes shown in FIGS. 1-2, the virtual images C'A' and D'B' can have different image resolution densities. In an example, a display size in FIG. 1 has a radius of 14.9 mm and a 100° FOV. The display size can be indicated by a display image circle (e.g., on the display device (120)) that is imaged by the optical system (110) onto the area (151). Thus, a 29.8 mm display diameter over the 100° FOV corresponds to 0.3 mm/deg FOV. If the display device (120) has a resolution of 40 lp/mm (or 80 pixel/mm), a first image resolution density corresponding to the first imaging mode in FIG. 1 is 0.3×80 pixel/deg or 24 pixel/deg. The display size in FIG. 2 has a radius of 21.6 mm and a 100° FOV. Thus, a 43.2 mm display diameter over the 100° FOV corresponds to 0.43 mm/deg FOV. For the same resolution of 40 lp/mm (or 80 pixel/mm) of the display device (120), a second image resolution density corresponding to the second imaging mode in FIG. 2 is 0.34×80 pixel/deg or 34 pixel/deg.

FIGS. 1-2 show the two imaging modes of the display system (100). A polarization state of a light beam can change by certain optical elements (e.g., (155) or (142)), the two imaging modes can correspond to two sets of polarization states of light beams traveling in the display system (100), such as a first set of polarization states of the first light beams at various positions in the first light path in the first imaging mode and a second set of polarization states of the second light beams at various positions in the second light path in the second imaging mode. Referring to FIGS. 1-2, the polarization controller (155) and the QWP (142) can control or change a polarization state. In an example shown in FIG. 1, the first set of polarization states of the first light beams includes (i) a first initial polarization state when the first light beams are between the display device (120) and the polarization controller (155), (ii) the $1^{st}$ CP when the first light beams are between the polarization controller (155) and the QWP (142), and (iii) the $1^{st}$ LP when the first light beams are between the QWP (142) and the area (151). The polarization controller (155) can be configured to change the first initial polarization state into the $1^{st}$ CP, and the QWP (142) can be configured to change the $1^{st}$ CP into the $1^{st}$ LP.

Referring to FIG. 2, in an example, the second set of polarization states includes (i) a second initial polarization state of the second light beams that are between the display device (120) and the polarization controller (155), (ii) the $2^{nd}$ CP of the second light beams that are between the polarization controller (155) and the QWP (142) before and during the first pass, (iii) the $2^{nd}$ LP after the second light beams come out of the QWP (142) during the first pass and before the second light beams are incident onto the QWP (142) during the second pass, (iv) an intermediate polarization state after the second light beams come out of the QWP (142) during the second pass and before the second light beams are incident onto the QWP (142) during the third pass, and (v) the $1^{st}$ LP of the second light beams that are between the QWP (142) and the area (151) during the third pass and after the third pass. The polarization controller (155) can be configured to change the second initial polarization state into the $2^{nd}$ CP, the QWP (142) can be configured to change the $2^{nd}$ CP into the $2^{nd}$ LP during the first pass, and the QWP (142) can be configured to change the $2^{nd}$ LP into the $1^{st}$ LP after the second light beams pass the QWP (142) twice in the second pass and the third pass.

The first initial polarization state can be identical to or different from the second initial polarization state.

In an example, the first imaging mode corresponds to the first polarization state (e.g., the $1^{st}$ CP) coming out of the polarization controller (155), and the second imaging mode corresponds to the second polarization state (e.g., the $2^{nd}$ CP) coming out of the polarization controller (155).

According to an embodiment of the disclosure, the two imaging modes can be multiplexed, for example, in a time domain (e.g., a time domain multiplexing) or in a spatial domain (e.g., a spatial domain multiplexing). Images formed by the two imaging modes can be multiplexed or combined into a single image, for example, an image is formed based on two images formed by the two imaging modes, respectively. The time domain multiplexing and the spatial domain multiplexing can be applied separately to the display system (100) or combined.

In the time domain multiplexing, the first imaging mode shown in FIG. 1 can be performed in a first period of time (e.g., at a first time point), and the second imaging mode shown in FIG. 2 can be performed in a second period of time (e.g., at a second time point). The first period of time can be different from the second period of time. In an example, the first period of time does not overlap with the second period of time. The second time point can be different from the first time point.

For example, referring to FIG. 1, the first light beam passes the polarization controller (155) and has the first polarization state (e.g., the $1^{st}$ CP) at the first time point. The optical system (110) can have the first focal length and the first magnification in the first period of time (e.g., at the first time point). The optical system (110) can form, in the first period of time (e.g., at the first time point), a first virtual image (e.g., C'A') of a first object (e.g., CA) located at a distance D4 from the optical system (110). For example, the first object (e.g., CA) is located at the display device (120), and a position of the first object can be indicated by a distance D1 between the display device (120) and the viewing position (e.g., the area (151)). The first virtual image located on the image plane (199) can be perceived at the first image distance D2 between the viewing position (e.g., the area (151)) and the image plane (199).

For example, referring to FIG. 2, the second light beam passes the polarization controller (155) and has the second polarization state (e.g., the $2^{nd}$ CP) at the second time point. The optical system (110) can have the second focal length and the second magnification in the second period of time (e.g., at the second time point). The optical system (110) can form, in the second period of time (e.g., at the second time point), a second virtual image (e.g., D'B') of a second object (e.g., DB) located at the distance D4 from the optical system (110). For example, the second object (e.g., DB) is located at the display device (120), and a position of the second object can be indicated by the distance D1. The second virtual image located on the image plane (299) can be perceived at the second image distance D2' between the viewing position (e.g., the area (151)) and the image plane (299). In the examples shown in FIGS. 1-2, the second focal length is different from the first focal length, the first image distance D2 is different from the second image distance D2', and the first magnification is different from the second magnification. For example, the first image distance D2 is 0.25 m and the second image distance D2' is 2 m.

In an example of the time domain multiplexing, in the first period of time (e.g., at the first time point), first light beams from pixels of the display device (120) can pass through the polarization controller (155) and the polarization controller (155) can control a polarization state of the light beams such that the first light beams have the first polarization state (e.g., the $1^{st}$ CP) coming out of the polarization controller (155). Each of the first light beams can pass through the optical cavity only one time and the pixels of the display device (120) can be imaged onto the image plane (199) using the first imaging mode. In the second period of time (e.g., at the second time point), second light beams from the pixels of the display device (120) can pass through the polarization controller (155) and the polarization controller (155) can control a polarization state of the second light beams such that the second light beams have the second polarization state (e.g., the $2^{nd}$ CP) coming out of the polarization controller (155). Each of the second light beams can pass through the optical cavity multiple (e.g., 3) times and the pixels of the display device (120) can be imaged onto the image plane (299) using the second imaging mode. The pixels of the display device (120) can include all pixels of the display device (120) or a portion of the display device (120).

In the time domain multiplexing, the two imaging modes can be switched at any suitable frequency. In an example, when the two imaging modes are switched at a frequency (e.g., a framerate) that is larger than a threshold, such as 30 hertz (Hz), 60 Hz, or the like, eyes may perceive two images formed by the two imaging modes in two different periods of time (e.g., at two different points) as a single image.

In the time domain multiplexing, the first imaging mode and the second imaging mode can be applied to a same object (e.g., a same region in the display device (120)) or different objects (e.g., different regions in the display device (120)). In an example of the time domain multiplexing, the polarization controller (155) is configured to control polarization states of light beams incident onto different regions of the polarization controller (155) uniformly.

In the spatial domain multiplexing, the first imaging mode and the second imaging mode can be applied in a same period of time (e.g., at a same time point or simultaneously). In an example of the spatial domain multiplexing, the first imaging mode shown in FIG. 1 can be performed on a first region of the display device (120), and the second imaging mode shown in FIG. 2 can be performed on a second region of the display device (120). The first region (e.g., a center region) of the display device (120) can correspond to a first region (e.g., a center region) of the polarization controller (155), and the second region (e.g., a peripheral region) of the display device (120) can correspond to a second region (e.g., a peripheral region) of the polarization controller (155).

In an embodiment, the polarization controller (155) includes wire-grid cells (e.g., liquid crystal pixels). In an example, liquid crystal pixels with a first kind of wire-grid (e.g., a 0° wire-grid) can manipulate polarization states of light beams into the first polarization state, and liquid crystal pixels with a second kind of wire-grid (e.g., a 90° wire-grid) can manipulate polarization states of light beams into the second polarization state. In an example, the pixel A and the pixel B are located at different locations on the display device (120). The first light beam from the pixel A is manipulated by a liquid crystal pixel located at a first location in the polarization controller (155), and the second light beam from the pixel B is manipulated by a liquid crystal pixel located at a second location in the polarization controller (155). The liquid crystal pixel located at the first location is associated with the first kind of wire-grid, and the liquid crystal pixel located at the second location is associated with the second kind of wire-grid.

For example, referring to FIG. 1, the first light beams from the first region (or the first object) (e.g., including CA) of the display device (120) pass the first region of the polarization controller (155) and have the first polarization state (e.g., the $1^{st}$ CP). The optical system (110) can have the first focal length and the first magnification for the first light beams passing the first region of the polarization controller (155). The optical system (110) can form the first virtual image (e.g., including C'A') of the first object located at the distance D4 from the optical system (110). For example, the first object is located at the display device (120), and the position of the first object can be indicated with the distance D1 between the display device (120) and the viewing position (e.g., the area (151)). The first virtual image located on the image plane (199) can be perceived at the first image distance D2 between the viewing position (e.g., the area (151)) and the image plane (199).

Referring to FIG. 2, the second light beams from the second region (or the second object) (e.g., including DB) of the display device (120) pass the second region of the polarization controller (155) and have the second polarization state (e.g., the $2^{nd}$ CP). The optical system (110) can have the second focal length and the second magnification for the second light beams passing the second region of the polarization controller (155). The optical system (110) can form the second virtual image (e.g., including D'B') of the second object located at the distance D4 from the optical system (110). For example, the second object is located at the display device (120), and the position of the second object can be indicated with the distance D1. The second virtual image located on the image plane (299) can be perceived at the second image distance D2' between the viewing position (e.g., the area (151)) and the image plane (299).

In the examples shown in FIGS. 1-2, the second focal length is different from the first focal length, the first image distance D2 (e.g., 0.25 m) is different from the second image distance D2' (e.g., 2 m), and the first magnification is different from the second magnification.

The multiplexing may allow a viewer to see a multi-focal scene or a 3D scene. In an example, an eye (e.g., the eye (60)) can perceive virtual images (or scenes) (e.g., C'A' and D'B') located at different distances (e.g., D2 and D2') from the eye. A scene (e.g., C'A' or D'B') can be selected or switched by controlling the polarization controller (155) using the time domain multiplexing or the spatial domain multiplexing.

The two imaging modes can be multiplexed (e.g., in the time domain or in the spatial domain) to generate a foveated image. In an embodiment, the first imaging mode shown in FIG. 1 is used to form a first virtual image with a first spatial resolution and a first magnification where the first virtual image spans a first FOV. The second imaging mode shown in FIG. 2 is used to form a second virtual image with a second spatial resolution and a second magnification where the second virtual image spans a second FOV. In an example, the first FOV is less than the second FOV, and the first spatial resolution is higher than the second spatial resolution. In an example, the first magnification is less than the second magnification. For example example, the first FOV is 10° where a field angle of the foveated image spans from −5° to 5°. A field angle of the foveated image associated with the second FOV may span from (i) −50° to −5° and 5° to 50° or (ii) from −50 to 50°. In an example, the surfaces (e.g., (one or more of (135)-(138)) of the lens system (130), the gap (133), and/or the like can be determined such that the first focal length of the optical system (110) in the first imaging mode is similar or identical to the second focal length of the optical system (110) in the second imaging mode. An image (e.g., a foveated image) can be formed based on the first virtual image and the second virtual image.

The display system (100) can be used for one eye where the two imaging modes can be multiplexed in any suitable way (e.g., in the time domain, in the spatial domain, or a combination of the time domain and the spatial domain multiplexing). The two imaging modes can be applied to different eyes in any suitable way.

The multiplexing may allow a viewer to see a multi-focal scene or a 3D scene. In an example, the first imaging mode with a first focal length is applied to a display device for a first eye, and the second imaging mode with a second focal length is applied to a display device for a second eye. In an example, first two imaging modes with two focal lengths are applied to the display device for the first eye, and second two imaging modes with two focal lengths are applied to the display device for the second eye. The first two imaging modes can be identical to or different from the second two imaging modes.

The optical system (110) includes a catadioptric optical system. For example, the catadioptric optical system (110) includes (i) refractive optical components (e.g., the lens system (130)) and (ii) reflective optical components (e.g., the beam splitter (141) when acting as a reflector to reflect light and the reflective polarizer (139) when acting as a reflector to reflect light).

The catadioptric optical system (110), such as shown in FIG. 2, may include a polarized catadioptric optical system. For example, when the light beams pass through the QWP (142), a polarization state of the light beams is manipulated by the QWP (142). Accordingly, the light beams are in one polarization state (e.g., $2^{nd}$ LP) and are reflected by the reflective polarizer (139) after the first pass, and the light beams are in another polarization state (e.g., $1^{st}$ LP) and are transmitted by the reflective polarizer (139) after passing the optical cavity for a third time.

The polarization controller (155) can be configured to manipulate a polarization state of a light beam passing through the polarization controller (155). For example, the light beam coming out of the polarization controller (155) can have the first polarization state (e.g., the $1^{st}$ CP) or the second polarization state (e.g., the $2^{nd}$ CP), as described above with reference to FIGS. 1-2. The polarization controller (155) can be a switchable polarization rotator configured to rotate a polarization state of a light beam. For example, the polarization controller (155) is a switchable half waveplate (½ waveplate) to rotate a polarization state of a light beam 90°, such as from 0° to 90°. The switchable ½ waveplate can be used in in a liquid crystal display (LCD), for example, to turn a pixel ON or OFF.

In an example, light beams emitted from the display device (120) have the first polarization state, such as the 1$^{st}$ CP. The polarization controller (155) can be a liquid crystal device controlled by an input voltage. When the input voltage is a first voltage, the polarization controller (155) does not affect polarization states of the light beams emitted from the display device (120), and the light beams coming out of the polarization controller (155) can have the 1$^{st}$ CP, such as shown in FIG. 1. When the input voltage is a second voltage, the polarization controller (155) can rotate the polarization states of the light beams emitted from the display device (120), and the light beams coming out of the polarization controller (155) can have the 2$^{nd}$ CP, such as shown in FIG. 2.

Figure 7:
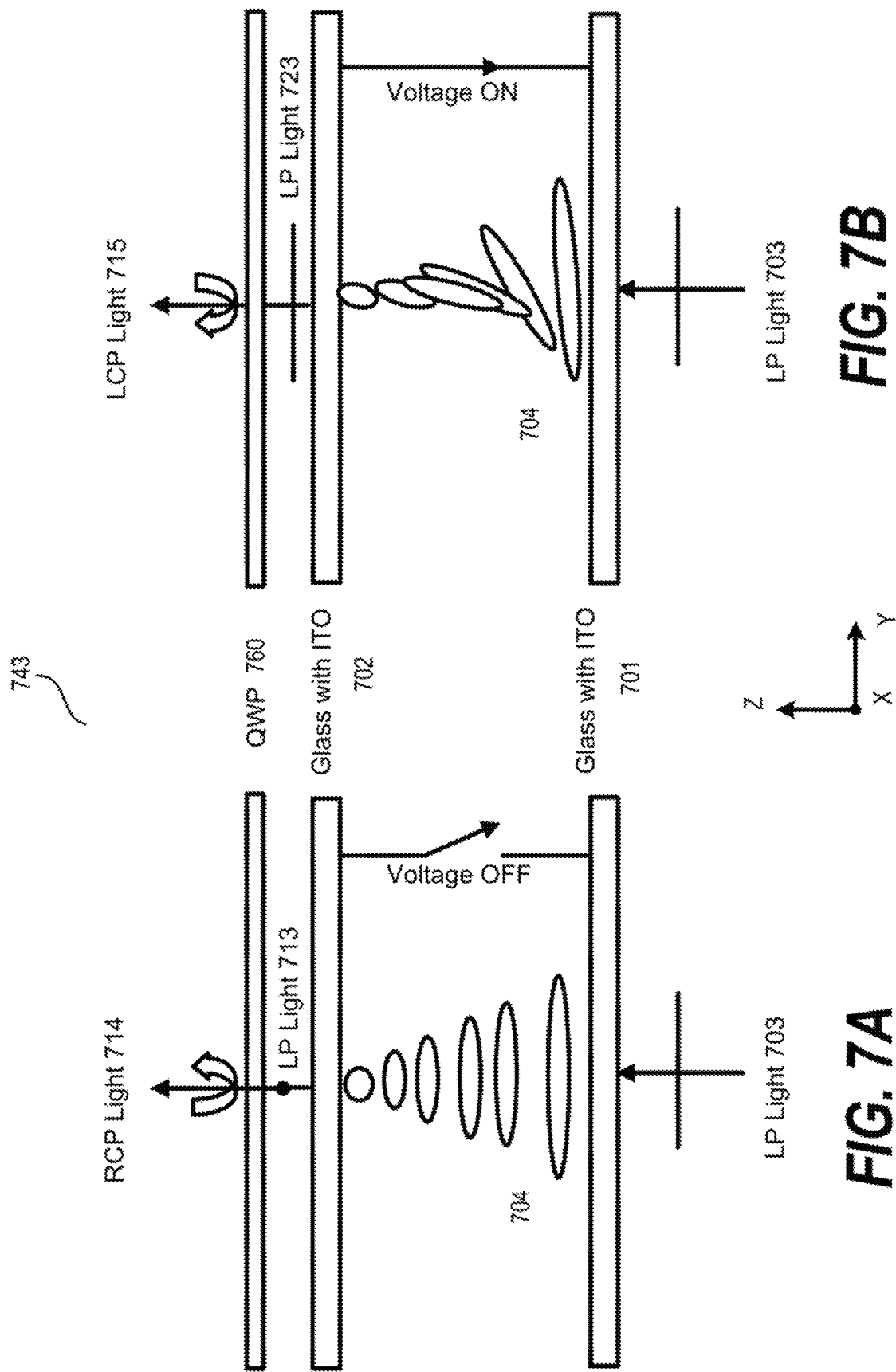
FIGS. 7A-7B show an exemplary liquid crystal spatial light modulator according to an embodiment of the disclosure.

FIGS. 7A-7B show an example of an LC spatial light modulator (SLM) (743). In an example, the polarization controller (155) includes the SLM (743) when light beams from the display device (120) are linearly polarized. In an example, the LC SLM (743) is made from twisted nematic (TN) LC materials (704) that have been arranged in a 90° twisted configuration, and is referred to as a TN SLM. The TN LC materials can be disposed between two electrodes (e.g., ITO) (701) and (702). Each electrode can be disposed on a respective transparent substrate (e.g., a glass substrate). In an example, an alignment material (e.g., polyimide) is disposed between the TN LC materials (704) and an electrode (e.g., (701)) to align the TN LC material (704).

The LC SLM (743) can be a TN LC polarization modulator as the LC SLM (743) can modulate a polarization state of light. The TN LC SLM (743) can be used to rotate a plane of polarization of light or manipulate a polarization state of light. An advantage of using the LC SLM (743) includes that the LC SLM (743) can be easily controlled and switched on and off using an electric field. Therefore, the plane of polarization can be rapidly changed or switched, such as in displays or in optical switches. The LC SLM (743) can be a fast-switchable TN SLM.

FIG. 7A shows the schematics of a 90° TN SLM with a voltage being 'OFF' (e.g., 0V). FIG. 7B shows the schematics of the 90° TN SLM with the voltage being 'ON' (e.g., 6V). A linearly polarized light beam (703) that is polarized, for example, along the Y axis is incident onto the LC SLM (743). Referring to FIG. 7A, when the voltage is "OFF", the TN LC materials can rotate 90° along the light path (e.g., along the Z axis) when no voltage is applied. The LC SLM (743) rotates the polarization of the light beam (703) by 90° (e.g., from Y axis to the X axis), and thus an output light beam (713) is linearly polarized along the X axis. Referring to FIG. 7B, when the voltage is "ON", the TN LC materials are oriented by an electrical field, for example, along the Z axis, and the LC SLM (743) does not change the polarization of the light beam (703). Thus, an output light beam (723) is linearly polarized along the Y axis. The output light beam (713) or (723) can subsequently go through a QWP to become a circularly polarized light, such as an RCP light beam (714) or an LCP light beam (715), respectively.

Figure 8:
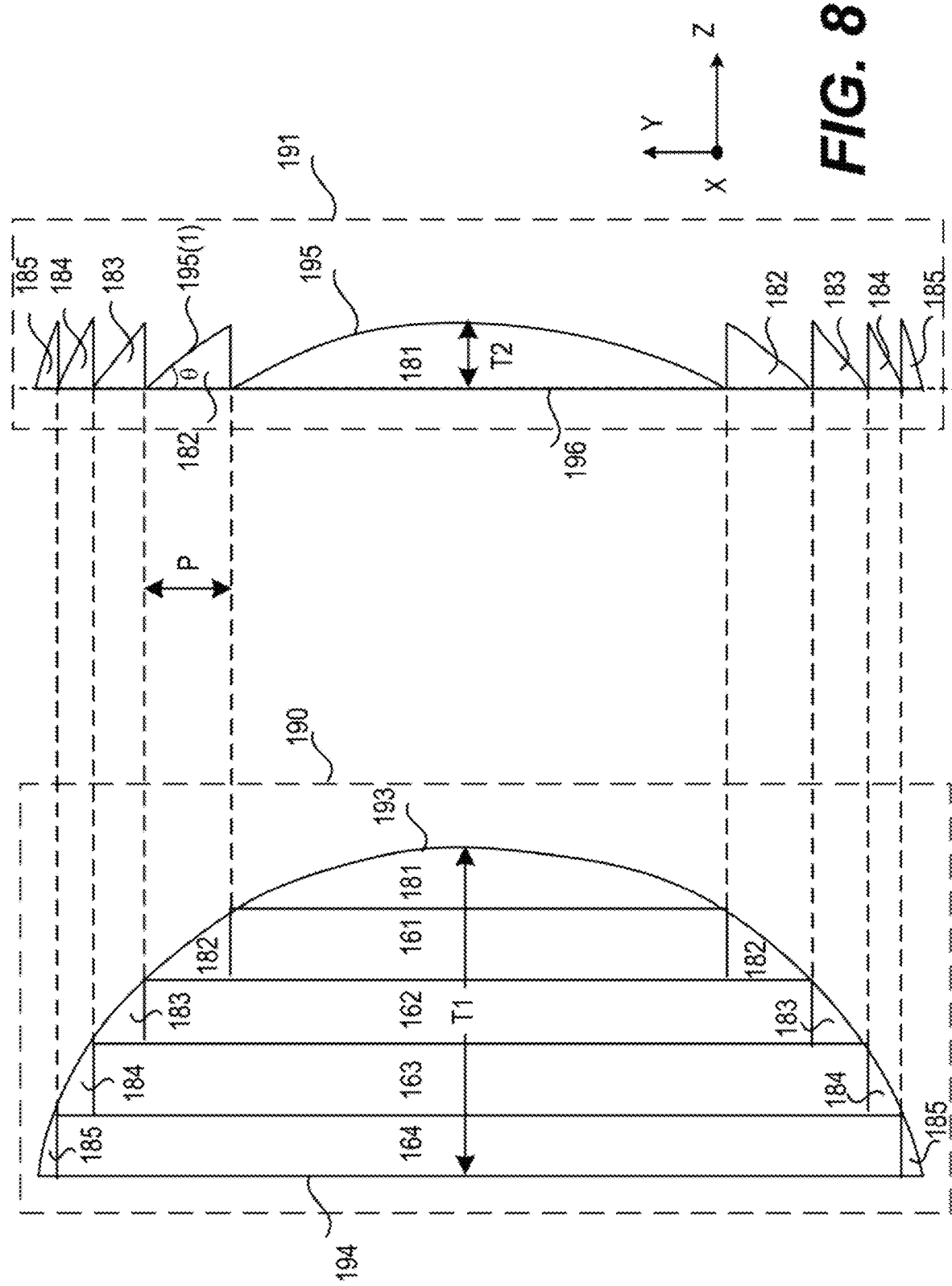
FIG. 8 shows a lens and a corresponding Fresnel lens according to an embodiment of the disclosure.

One or more lenses in the lens system (130) can include a microstructure, such as a Fresnel structure including a plurality of grooves, such as concentric grooves or a set of concentric annular sections and can be referred to as Fresnel lens(es). FIG. 8 shows a lens (190) and a corresponding Fresnel lens (191) according to an embodiment of the disclosure. The lens (190) includes an optical transparent member between surfaces (193)-(194). The lens (190) has a largest thickness T1, for example, at a center of the lens (190). The Fresnel lens (191) can include an optical transparent member between surfaces (195)-(196). A surface curvature of the smooth surface (193) of the lens (190) can be preserved by the grooved surface (195) of the Fresnel lens (191), and thus the Fresnel lens (191) can have a same or substantially identical focal length as that of the lens (190). For example, the smooth surface (193) of the lens (190) are divided into smaller concentric portions (181)-(185), and the portions (181)-(185) are shifted along an optical axis (e.g., parallel to the Z axis in FIG. 8) of the lens (190) to form the Fresnel lens (191). In an example, shapes of the portions (181)-(185) in the lens (190) are identical or substantially identical to respective shapes of the portions (181)-(185) in the Fresnel lens (191).

The portions (181)-(185) of the Fresnel lens (191) correspond to the portions (181)-(185) of the lens (190), for example, the portions (181)-(185) of the Fresnel lens (191) have identical shapes and materials as those of the portions (181)-(185) of the lens (190). To illustrate the relationship between the lens (190) and the Fresnel lens (191), portions (161)-(164) of the lens (190) can be considered as removed, and the remaining portions (181)-(185) of the lens (190) can be considered as realigned or shifted to the surface (196) (e.g., parallel to the XY plane). The lens (190) can be considered as collapsed into the Fresnel lens (191) while preserving the surface curvature of the surface (193), and thus preserving the optical power of the lens (190). The smooth surface (193) can become a grooved surface (195) with discontinuities between the adjacent portions (181)-(185). A largest thickness T2, for example, at a center of the Fresnel lens (191) is less than the thickness T1 at the center of the lens (190). Various methods can be applied to manufacture the Fresnel lens (191).

In some embodiments, a surface of the portion (e.g., the center portion) (181) of the Fresnel lens (191) is continuous or smooth and does not include a Fresnel structure. A surface of a peripheral portion (e.g., including the portions (182)-(185)) of the Fresnel lens (191) that surrounds the center portion (181) can be grooved and can include the Fresnel structure. A size of the center portion (181) without a Fresnel structure and a size of the peripheral portion including the Fresnel structure can be chosen, for example, based on design requirements.

Referring to FIG. 8, the Fresnel structure can include a plurality of grooves (e.g., concentric grooves) such as the portions (182)-(185). A pitch P can represent a spacing between adjacent prisms. The pitch P can be non-uniform (such as shown in FIG. 8) or uniform. A slope angle θ can represent an angle between the surface (196) and a respective portion (e.g., (195(1)) of the surface (195). Parameters of the Fresnel lens (191) including but not limited to a size of the pitch P, a distribution of the pitch P across the Fresnel structure, and the slope angles θ can be determined, for example, based on design requirements.

In some examples, size(s) of respective center portion(s) of a Fresnel lens, such as the size of the center portion (181), are less than a threshold, for example, the size of the center portion (181) is comparable or identical to the pitch of another groove (e.g., (182)), the plurality of grooves can include the center portion(s) (e.g., (181)), and the Fresnel structure can include the entire Fresnel lens.

In an example, such as shown in FIGS. 1-2, the first lens (131) is a Fresnel lens. The Fresnel lens (131) can include a Fresnel structure (175). The surface (135) and/or the surface (136) can include a grooved surface. Referring to FIGS. 1-2, the surface (136) can include the Fresnel structure (175). As described in FIG. 8, the grooved surface of the Fresnel lens (131) can be flatter than a surface of a lens having the same or similar focal length. The Fresnel lens (131) can be thinner or flatter than the corresponding lens having the same or similar focal length. In an example, the Fresnel structure (175) surrounds a smooth center portion of the surface (136).

The descriptions of the two imaging modes and the multiplexing methods can be applied to an optical system including no Fresnel lens, one Fresnel lens (e.g., (131) being the Fresnel lens shown in FIG. 1-2 or (132) being the Fresnel lens), or multiple Fresnel lenses.

Referring to FIGS. 1-2, in an example, the lens system (130) includes two lens subsystems: the Fresnel lens (131) and a pancake lens. The pancake lens can include the lens (132), the beam splitter (141) (e.g., a 50/50 beam splitter), a reflective polarizer mirror (e.g., the reflective polarizer (139)), and a waveplate (e.g., the QWP (142)) to control a polarization in the optical cavity (e.g., the folded mirror cavity in FIG. 2). The display system (100) can include the display device (120), a lens module (e.g., the lens system (130)), and the switchable polarization rotator (e.g., (155)). In an example, the display system (100) includes a light receiver or a light detector, such as the eye (60). The switchable polarization rotator (e.g., (155)) can control the polarization bases of light beams in the display system (100) where the polarization bases can be in one of two polarization bases.

The display system (100) can be a component in an artificial reality system. The artificial reality system can adjust reality in some manner into artificial reality and then present the artificial reality to a user. The artificial reality can include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an embodiment, a "near eye" display system can include an optical system (e.g., including one or more optical elements) and a display device that are placed within the distance threshold of an eye of a user when the NED system (100) (e.g., an HMD, or smart glasses) is utilized. Referring to FIGS. 1-2, the distance D1 between the display device (120) and the area (151) can be less than or equal to the distance threshold. In an example, the distance D1 is between the display device (120) and the eye (60).

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

A polarization state of a light beam traveling in the display system (100) can be controlled to reduce a polarization leakage. Waveplate(s) (e.g., (142) and/or (155)) that can control polarization rotation(s) over a designed wavelength range (e.g., a broad wavelength range where the waveplate(s) are achromatic over the designed wavelength range) and over a designed angular range (e.g., a large angular range) in the display system (100) can reduce ghosts in the display system (100). In an example, birefringence properties of injection molded lenses in a pancake optical system (e.g., the display system (100)) are to be considered to maintain a polarization control in the pancake optical system (e.g., the display system (100)). Scattering, haze including surface scattering and bulk scattering can cause a lower image sharpness and more strayed light. For a reflection based optical system, a mirror quality and mirror surface finish can be important for a reflective wavefront quality. Thus, in optical modeling, surface finish of a fabrication process can be considered to better simulate design performance.

Polarized catadioptric optical systems are emerging solutions for virtual reality HMDs. A good VR optical system can include a large pupil volume (also referred to as an eye box) to accommodate multiple interpupillary distances and to allow for eye rotation as the user scans across the FOV. In an example, the eye box indicates a volume where an eye receives an acceptable view of an image. A size and a location of the eye box can be related to a number of constraints, such as a FOV and image quality. In an example, the eye box indicates a range of eye positions, at an eye relief distance, from which an image produced by the optical system (110) is visible. The eye box can include eye movements, such as eye rotation and/or lateral movement.

In a polarized catadioptric optical system, such as the display system (100), a folded optical path (e.g., the folded path (225) between the beam splitter (141) and the reflective polarizer (139)) can be used to achieve a relatively high optical power with a compact form factor. In the example shown in FIG. 2, the beam splitter (141) is a curved mirror that partially reflects and partially transmits light, and the reflective polarizer (139) can reflect as a planar mirror or transmit light depending on a polarization state of the light. Design freedoms available in a folded optical system (e.g., the optical system (110)) can provide benefits to HMD systems. The benefits can include a high resolution achieved with reflective imaging, a wide FOV (e.g., by using low aberration lenses), a compact size, a decreased weight, an ability to adjust focus, and forming a larger eye box. The optical system (110) shown in FIGS. 1-2 can be manufactured, for example, by controlling a curved form and surface finish of the first lens (131) and the second lens (132). A pancake optical system (e.g., the display system (100)) can deliver a comfortable and immersive user experience.

The display system (100) can have a large pupil volume to accommodate multiple interpupillary distances and to allow for eye rotation as a user scans across the FOV. An interpupillary distance (IPD) is a distance between centers of pupils of eyes of a user. IPDs can vary with respect to age, gender, or the like. The display system (100) can be designed by taking IPD variance into account such that the optical system (110) can accommodate various users with different IPDs. In an example, IPDs vary from approximately 50 to 80 mm.

In an example, to allow users to enjoy VR without prescription glasses or with a dynamic focus, the display system (100) can adjust a diopter of a lens in the lens system (130) to match the prescription. In an example, the diopter indicates a virtual object distance. Increasing the diopter can make an object appear closer. The focus accommodation can be achieved by changing an optical power of the optical system. The optical power of a folded mirror cavity (e.g., the optical cavity between the beam splitter (141) and the reflective polarizer (139)) can be changed by varying a cavity length (or a gap) relative to a reference cavity length corresponding to a reference optical power.

Referring back to FIGS. 1-2, the shift block (170) can be coupled to the optical system (110) and optionally the display device (120) to apply suitable spatial pixel shift adjustments to the virtual images. The controller (180) can be coupled to the optical system (110) and the shift block (170) to control the operations of the optical system (110) and the shift block (170).

The shift block (170) can apply the spatial pixel shift adjustment mechanically or optically. The shift block (170) can include a mechanical shifter to apply the spatial pixel shift adjustment. In some examples, the mechanical shifter can shift the display device (120) to apply the spatial pixel shift adjustment. In some examples, the mechanical shifter can shift at least one optical element (e.g., the first lens (131) or the second lens (132)) to apply the spatial pixel shift adjustment. A relatively small adjustment to the gap (133) can be amplified, for example, 3 times, due to the folded path (225) in the optical cavity in FIG. 2.

The display system (100) can include other suitable mechanical, electrical and optical components. For example, the display system (100) includes a frame (101) that can protect other components of the display system (100). In another example, the display system (100) can include a strap (not shown) to fit the display system (100) on a user's head. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

In some examples, parameters of the display system (100) include a FOV, an eye relief, a lens track length, a display size, a size of the area (151), and/or the like. The eye relief can refer to a distance between a viewing position of a light receiver (e.g., the area (151)) and the lens system (130). The lens track length can refer to a distance between the display device (120) and the lens system (130). The display size is indicated by a display image circle that is imaged by the optical system (110) onto the area (151). The display system (100) in FIGS. 1-2 can have the identical eye relief, the identical lens track length, and the identical size (e.g., pupil size) of the area (151) (e.g., 5 mm). The optical system (110) can form virtual images on the image planes (199) or (299) with the two imaging modes for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

Embodiments in the disclosure may be used separately or combined in any order.

A computer or computer-readable medium can control various aspects of an HMD system in which the display system (100) including the optical system (110) is incorporated. Various aspects of the display system (100) including controlling movements and positioning of the optical components (e.g., the first lens (131), the second lens (132), the display device (120)) and the operation of the polarization controller (155) can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
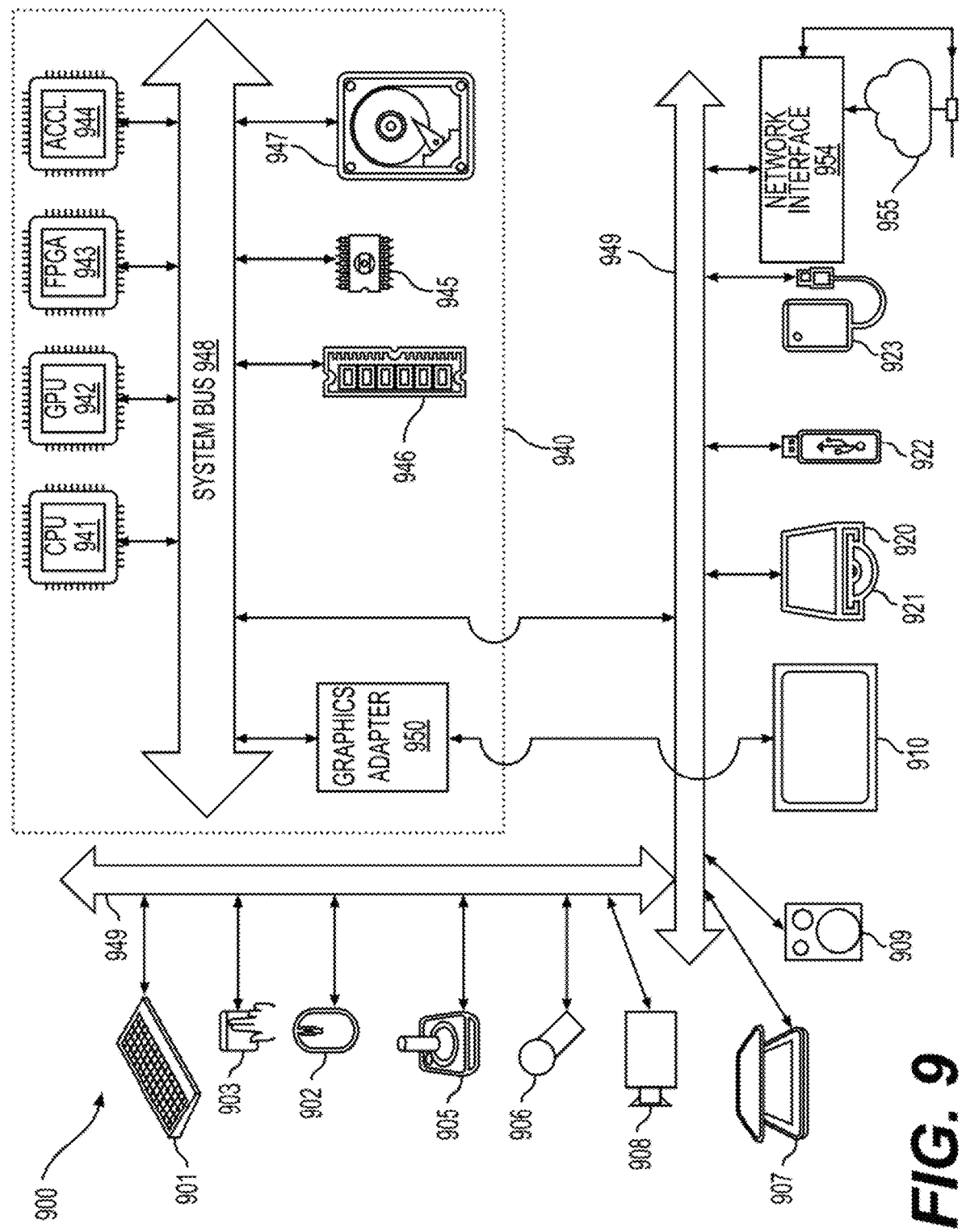
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch-screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as touch-screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, graphics adapters (950), and so forth. These devices, along with Read-only memory (ROM) (945), Random-access memory (946), internal mass storage (947) such as internal non-user accessible hard drives, SSDs, and the like, may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the touchscreen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (900) having architecture, and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An optical system, comprising:
  a polarization controller configured to control polarization states of light beams incident onto the polarization controller such that a polarization state of each light beam passing through the polarization controller has one of a first polarization state and a second polarization state;
  a beam splitter configured to partially transmit and partially reflect the light beams incident onto the beam splitter;
  a reflective polarizer configured to pass the light beams having a third polarization state and reflect the light beams having a fourth polarization state that is orthogonal to the third polarization state; and
  one or more lenses between the beam splitter and the reflective polarizer, wherein
  in response to a polarization state of a first light beam of the light beams that passes through the polarization controller having the first polarization state, the first light beam passes the one or more lenses only one time, and
  in response to a polarization state of a second light beam of the light beams that passes through the polarization controller having the second polarization state, the second light beam passes the one or more lenses more than one time.

2. The optical system according to claim 1, wherein
  the polarization state of the first light beam that passes through the polarization controller has the first polarization state, the first light beam passes the one or more lenses only one time, and a first focal length of the one or more lenses for the first light beam in the first polarization state is different from a second focal length of the one or more lenses for the second light beam in the second polarization state.

3. The optical system according to claim 1, wherein the polarization state of the second light beam that passes the polarization controller has the second polarization state, and the second light beam passes the one or more lenses more than one time.

4. The optical system according to claim 3, wherein an optical cavity including the one or more lenses is formed between the beam splitter and the reflective polarizer, and the second light beam passes the optical cavity three times before reaching a viewing position.

5. The optical system according to claim 1, further comprising:

a quarter waveplate (QWP) that is positioned between the beam splitter and the reflective polarizer.

6. The optical system according to claim 5, wherein the optical system further includes a first lens, the one or more lenses includes a second lens, the second lens is positioned between the first lens and a display device, and the first lens is positioned between the second lens and a viewing position.

7. The optical system according to claim 6, wherein the first lens and the second lens are separated by a gap.

8. The optical system according to claim 6, wherein one of the first lens and the second lens includes a Fresnel structure.

9. The optical system according to claim 6, wherein the beam splitter is positioned between the second lens and the display device, the reflective polarizer is positioned between the first lens and the second lens, and the QWP is positioned between the beam splitter and the reflective polarizer.

10. The optical system according to claim 1, wherein the first light beam passes the polarization controller at a first time point, the optical system has a first focal length at the first time point, the second light beam passes the polarization controller at a second time point that is different from the first time point, and the optical system has a second focal length at the second time point, the second focal length being different from the first focal length.

11. The optical system according to claim 10, wherein the optical system forms, at the first time point, a first virtual image of a first object located at a distance from the optical system, the first virtual image being perceived at a first distance from a viewing position, a first magnification being a ratio of a size of the first virtual image over a size of the first object, the optical system forms, at the second time point, a second virtual image of a second object located at the distance from the optical system, the second virtual image being perceived at a second distance from the viewing position, the second distance being different from the first distance, a second magnification being a ratio of a size of the second virtual image over a size of the second object, and the second magnification is different from the first magnification.

12. The optical system according to claim 11, wherein the first distance is a multiple of the second distance.

13. The optical system according to claim 11, wherein an image is formed based on the first virtual image and the second virtual image.

14. The optical system according to claim 1, wherein the first light beam passes a first region of the polarization controller, the optical system has a first focal length for the first light beam passing the first region of the polarization controller, the second light beam passes a second region of the polarization controller that is different from the first region, and the optical system has a second focal length for the second light beam passing the second region of the polarization controller, the second focal length being different from the first focal length.

15. The optical system according to claim 14, wherein the optical system forms a first virtual image of a first object located at a distance from the optical system, the first light beam from the first object passing the first region of the polarization controller, the first virtual image being perceived at a first distance from a viewing position, and the optical system forms a second virtual image of a second object located at the distance from the optical system, the second light beam from the second object passing the second region of the polarization controller, the second virtual image being perceived at a second distance from the viewing position, the second distance being different from the first distance.

16. The optical system according to claim 15, wherein a first magnification is a ratio of a size of the first virtual image over a size of the first object, a second magnification is a ratio of a size of the second virtual image over a size of the second object, and the second magnification is different from the first magnification.

17. The optical system according to claim 15, wherein an image is formed based on the first virtual image and the second virtual image.

* * * * *